United States Patent
Yanai

(10) Patent No.: US 10,158,820 B2
(45) Date of Patent: Dec. 18, 2018

(54) IMAGING APPARATUS HAVING IMAGE SENSOR TO REDUCE COLUMN NOISE

(71) Applicant: CANON KABUSHIKI KAISHA, Tokyo (JP)

(72) Inventor: Toshikazu Yanai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 15/080,301

(22) Filed: Mar. 24, 2016

(65) Prior Publication Data
US 2016/0286144 A1    Sep. 29, 2016

(30) Foreign Application Priority Data

Mar. 26, 2015  (JP) ................. 2015-065245

(51) Int. Cl.
| | |
|---|---|
| H04N 5/225 | (2006.01) |
| H04N 5/378 | (2011.01) |
| H04N 5/3745 | (2011.01) |
| H04N 5/376 | (2011.01) |

(52) U.S. Cl.
CPC .......... *H04N 5/378* (2013.01); *H04N 5/3765* (2013.01); *H04N 5/37455* (2013.01)

(58) Field of Classification Search
CPC ............. H04N 5/37213; H04N 3/1575; H04N 5/3742; H04N 5/378
See application file for complete search history.

(56) References Cited

U.S. PATENT DOCUMENTS

| | | | | |
|---|---|---|---|---|
| 2003/0043089 | A1* | 3/2003 | Hanson ................ | H04N 3/1593 345/55 |
| 2005/0068440 | A1* | 3/2005 | Gomi .................. | H04N 3/1512 348/308 |
| 2006/0012698 | A1* | 1/2006 | Nitta ...................... | H04N 3/155 348/308 |
| 2008/0055439 | A1* | 3/2008 | Mabuchi .............. | H04N 5/3532 348/296 |
| 2008/0136948 | A1* | 6/2008 | Muramatsu ........... | H04N 5/335 348/294 |
| 2008/0258042 | A1* | 10/2008 | Krymski ................ | H04N 3/155 250/208.1 |
| 2009/0173974 | A1* | 7/2009 | Shah .................. | H04N 5/37457 257/292 |
| 2009/0219420 | A1* | 9/2009 | Kuroda .................. | H04N 5/343 348/281 |
| 2010/0149391 | A1* | 6/2010 | Kameshima ............. | H04N 5/32 348/300 |

(Continued)

FOREIGN PATENT DOCUMENTS

| | | |
|---|---|---|
| JP | 2005323331 A | 11/2005 |
| JP | 2005333462 A | 12/2005 |

*Primary Examiner* — Jason A Flohre
*Assistant Examiner* — Dwight Alex C Tejano
(74) *Attorney, Agent, or Firm* — Canon U.S.A., Inc. IP Division

(57) ABSTRACT

A plurality of analog-to-digital (AD) conversion units is provided in a column signal line connecting commonly to vertical pixel columns. A signal of one pixel is digitized by the plurality of AD conversion units and averaged to achieve noise reduction. Operations for reading signals from a plurality of pixels are performed in parallel for alleviating the decrease of the frame rate.

7 Claims, 19 Drawing Sheets

(56) References Cited

U.S. PATENT DOCUMENTS

| | | | |
|---|---|---|---|
| 2011/0025900 A1* | 2/2011 | Kondo | H04N 5/378 348/308 |
| 2014/0160333 A1* | 6/2014 | Takeda | H04N 5/3742 348/308 |
| 2014/0313385 A1* | 10/2014 | Sato | H04N 5/378 348/302 |
| 2016/0156861 A1* | 6/2016 | Kitani | H04N 5/374 348/308 |

* cited by examiner

| | S01 S02 S03 S04 S05 S06 S07 | S08 | S09 S10 | S11 | S12 | S13 | S14 |
|---|---|---|---|---|---|---|---|
| Opr1 | n1 | An1 | s1 | As1 | Dout1 | n2 | An2 | s2 | As2 | Dout2 | n3 | An3 | s3 | As3 |
| Opr2 | n1 | An1 | s1 | As1 | ---- | n2 | An2 | s2 | As2 | ---- | n3 | An3 | s3 | As3 |

FIG. 9A (LSB)                                         (MSB)

| | 1 | 2 | 3 | 4 | 5 | 6 | 7 | 8 | 9 | 10 |
|---|---|---|---|---|---|---|---|---|---|---|
| ADo1 | 1 | 1 | 0 | 1 | 1 | 0 | 1 | 1 | 0 | 1 |
| ADo2 | 1 | 0 | 1 | 1 | 1 | 0 | 1 | 1 | 0 | 1 |

FIG. 9B (LSB)                                         (MSB)

| | 1 | 2 | 3 | 4 | 5 | 6 | 7 | 8 | 9 | 10 | 11 |
|---|---|---|---|---|---|---|---|---|---|---|---|
| Add | 0 | 0 | 0 | 1 | 1 | 1 | 0 | 1 | 1 | 0 | 1 |

FIG. 9C (LSB)                                         (MSB)

| | 1 | 2 | 3 | 4 | 5 | 6 | 7 | 8 | 9 | 10 |
|---|---|---|---|---|---|---|---|---|---|---|
| Ave | 0 | 0 | 1 | 1 | 1 | 0 | 1 | 1 | 0 | 1 |

| | S01 S02 S03 S04 S05 S06 S07 | S08 | S09 S10 | S11 | S12 | S13 S14 |
|---|---|---|---|---|---|---|
| Opr1 | n1 \| An1 \| s1 \| As1 | Dout1 | n2 \| An2 \| s2 \| As2 | | Dout2 | n3 \| An3 \| s3 \| As3 |
| Opr2 | n1 \| An1 \| s1 \| As1 | --- | n2 \| An2 \| s2 \| As2 | | --- | n3 \| An3 \| s3 \| As3 |
| Opr3 | n1 \| An1 \| s1 \| As1 | --- | n2 \| An2 \| s2 \| As2 | | --- | n3 \| An3 \| s3 \| As3 |
| Opr4 | n1 \| An1 \| s1 \| As1 | --- | n2 \| An2 \| s2 \| As2 | | --- | n3 \| An3 \| s3 \| As3 |

FIG. 14A

|      | (LSB) |   |   |   |   |   |   |   |   | (MSB) |
|------|---|---|---|---|---|---|---|---|---|----|
|      | 1 | 2 | 3 | 4 | 5 | 6 | 7 | 8 | 9 | 10 |
| ADo1 | 1 | 1 | 0 | 1 | 1 | 0 | 1 | 1 | 0 | 1  |
| ADo2 | 1 | 1 | 1 | 1 | 1 | 0 | 1 | 1 | 0 | 1  |
| ADo3 | 0 | 1 | 0 | 1 | 0 | 1 | 1 | 0 | 1 | 1  |
| ADo4 | 0 | 0 | 1 | 1 | 1 | 0 | 1 | 1 | 0 | 1  |

FIG. 14B

|     | (LSB) |   |   |   |   |   |   |   |   |    |   | (MSB) |
|-----|---|---|---|---|---|---|---|---|---|----|---|----|
|     | 1 | 2 | 3 | 4 | 5 | 6 | 7 | 8 | 9 | 10 |   |    |
| Add | 0 | 0 | 0 | 0 | 1 | 1 | 1 | 0 | 1 | 1  | 0 | 1  |

FIG. 14C

|     | (LSB) |   |   |   |   |   |   |   |   | (MSB) |
|-----|---|---|---|---|---|---|---|---|---|----|
|     | 1 | 2 | 3 | 4 | 5 | 6 | 7 | 8 | 9 | 10 |
| Ave | 0 | 0 | 1 | 1 | 1 | 0 | 1 | 1 | 0 | 1  |

FIG. 16

IMAGING APPARATUS HAVING IMAGE SENSOR TO REDUCE COLUMN NOISE

BACKGROUND OF THE INVENTION

Field of the Invention

One disclosed aspect of the embodiments relates to an imaging apparatus.

Description of the Related Art

In recent years, imaging apparatuses such as a digital still camera and a digital video camera have been widely spread in which captured images can be saved as digital data. Such an imaging apparatus includes image pickup devices such as a CMOS (Complementary Metal Oxide Semiconductor) type image sensor (hereinafter, CMOS sensor) which reads out pixel signals based on xy addressing scheme.

In a CMOS sensor, random access to pixels can be performed. Furthermore, compared with a CCD (Charge Coupled Device) type image sensor (hereinafter, CCD sensor), a signal can be read out at a higher speed from a CMOS sensor, which is highly sensitive and consumes less electric power.

Unlike a CCD sensor which directly transfers a signal charge having undergone photoelectric conversion in a pixel to an output circuit, a CMOS sensor outputs a pixel signal converted to voltage in each pixel by performing signal processing in a column circuit. Thus, noise occurring in the column circuit may be added to the pixel signal. Accordingly, as disclosed in Japanese Patent Laid-Open No. 2005-333462, a CMOS sensor may include a column amplifier in a column circuit, and a pixel signal is amplified in the column amplifier so that the ratio of noise in the column circuit to the pixel signal can be improved.

However, the amplification of a pixel signal in the column amplifier may increase the operating voltage of the column circuit, consuming an increased amount of electric power. In order to solve this problem, as disclosed in Japanese Patent Laid-Open No. 2005-323331, a CMOS sensor having an analog-digital (AD) converting circuit in a column circuit may not include a column amplifier for reduction of power consumption and operating voltage.

A CMOS sensor which does not have a column amplifier within a column circuit, as disclosed in Japanese Patent Laid-Open No. 2005-323331, may have column noise occurring in the column circuit. In order to reduce the column noise, a signal in one pixel may be read out a plurality of number of times, and the read signals are added every time.

However, because such signals are added after executing signal processing thereon in the column circuit in a CMOS sensor, the noise reduction processing may take time and thus significantly lower the frame rate, still disadvantageously.

SUMMARY OF THE INVENTION

One disclosed aspect of the embodiments provides an imaging apparatus without a column amplifier, in which column noise occurring in a column circuit can be reduced without reducing the speed for reading out an image signal.

An imaging apparatus according to an exemplary embodiment of the disclosure includes an image pickup device having a pixel array in which a plurality of pixels is arranged in a matrix form, a column signal line provided for each column of the pixel array and receiving input of signals of the plurality of pixels of the column, and a first signal processing unit and a second signal processing unit provided in parallel for the column signal line, and a drive unit configured to drive the image pickup device in one driving mode of a first driving mode in which an output signal of a first pixel in the pixel array is processed in the first signal processing unit and a signal of a second pixel different from the first pixel is processed by the second signal processing unit and a second driving mode in which an output signal of one pixel in the pixel array is processed by the first signal processing unit and the second signal processing unit in parallel.

Further features of the disclosure will become apparent from the following description of exemplary embodiments with reference to the attached drawings.

BRIEF DESCRIPTION OF THE DRAWINGS

FIG. 6 illustrates the overlap-reading operation according to the first exemplary embodiment.

FIG. 8 illustrates a noise reduction operation according to the first exemplary embodiment.

FIGS. 9A to 9C illustrate computing for the noise reduction operation according to the first exemplary embodiment.

FIG. 12 illustrates an overlap-reading operation according to the second exemplary embodiment.

FIG. 13 illustrates a noise reduction operation according to the second exemplary embodiment.

FIGS. 14A to 14C illustrate computing for the noise reduction operation according to the second exemplary embodiment.

FIG. 16 illustrates a noise reduction operation according to the third exemplary embodiment.

DESCRIPTION OF THE EMBODIMENTS

Exemplary embodiments of the disclosure will be described in detail below with reference to the attached drawings. It should be understood that exemplary embodiments which will be described below are merely examples of implementations of the disclosure and that changes, modifications or alterations should be made thereto properly in accordance with the configuration of an apparatus to which the disclosure is applied or with a given condition. The disclosure is not to be intended as being limited to the following exemplary embodiments.

First Exemplary Embodiment

Figure 1:
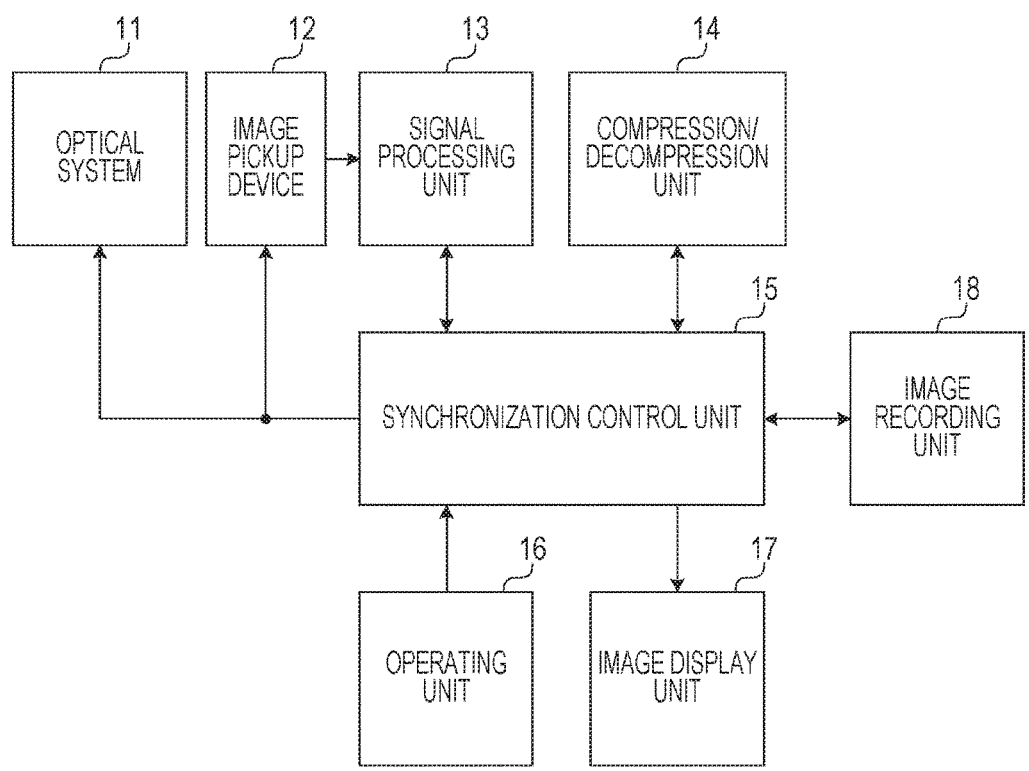
FIG. 1 illustrates a configuration of an imaging apparatus according to an exemplary embodiment.

A first exemplary embodiment will be described with reference to FIG. 1 to FIGS. 9A to 9C. FIG. 1 illustrates a configuration of an imaging apparatus according to this exemplary embodiment. An imaging apparatus according to this exemplary embodiment is applicable to a digital still camera and a digital video camera.

An imaging apparatus illustrated in FIG. 1 includes an optical system 11, an image pickup device 12, a signal processing unit 13, a compression/decompression unit 14, a synchronization control unit 15, an operating unit 16, an image display unit 17, and an image recording unit 18. The optical system 11 may have a lens for forming an image of a photographic subject, a lens drive mechanism for zooming and focusing, a mechanical shutter mechanism, and a stop mechanism. These movable parts are driven based on a control signal from the synchronization control unit 15.

The image pickup device 12 is an XY address type CMOS sensor and is configured to perform an imaging operation such as exposure, signal readout, and reset in accordance with a control signal from the synchronization control unit 15. A digitized image signal is then output through analog-to-digital (AD) conversion processing performed by an AD converting circuit provided therein.

The signal processing unit 13 performs a signal process on the digitized image signal input from the image pickup device 12 under control of the synchronization control unit 15. The compression/decompression unit 14 operates under control of the synchronization control unit 15 and may execute compression and encoding processing on the image signal processed by the signal processing unit 13 and execute decompression and decoding processing on the encoded data of a still image supplied from the synchronization control unit 15. Compression and encoding and decompression and decoding processing may be performed on a moving image.

The synchronization control unit 15 may be a microcontroller including, for example, a CPU (central processing unit), a ROM (read only memory), and a RAM (random access memory). A program stored in the ROM may be executed to generally control the components of the imaging apparatus. The operating unit 16 may include operating keys such as a shutter release button, a lever, and dials, and output to the synchronization control unit 15 a control signal according to an input operation performed by a user.

The image display unit 17 includes a display device such as an LCD (liquid crystal display) and an interface circuit for that and generates an image signal for display from an image signal supplied from the synchronization control unit 15. Then, the signal is supplied to a display device so that the corresponding image can be displayed. The image recording unit 18 may be connected to a recording medium including a portable semiconductor memory, for example, and receives and stores from the synchronization control unit 15 an image data file having undergone compression and encoding performed by the compression/decompression unit 14. The image recording unit 18 reads out data designated based on a control signal from the synchronization control unit 15 and outputs it to the synchronization control unit 15.

Here, basic operations to be performed in the imaging apparatus will be described. Before imaging a still image, image signals output from the image pickup device 12 are sequentially supplied to the signal processing unit 13. The signal processing unit 13 performs image quality correction processing on the image signals from the image pickup device 12 and supplies the results as a camera-through-image signal to the image display unit 17 through the synchronization control unit 15. Thus, the camera through image is displayed so that a user can check the display image to adjust the viewing angle.

In this state, when the shutter release button in the operating unit 16 is pressed, image signals of one frame from the image pickup device 12 are captured by the signal processing unit 13 under control of the synchronization control unit 15. The signal processing unit 13 performs the image quality correction processing on the captured image signals of one frame and supplies the processed image signals to the compression/decompression unit 14. The compression/decompression unit 14 performs compression and encoding on the input image signals and supplies the encoded data generated therefrom to the image recording unit 18 through the synchronization control unit 15. Thus, the data file of the captured still image can be recorded in the recording medium by the image recording unit 18.

On the other hand, in order to reconstruct a data file of a still image recorded in the recording medium and selected by controlling the image recording unit 18 in accordance with an operation input from the operating unit 16, the synchronization control unit 15 reads the data file from the recording medium. The read data file is supplied to the compression/decompression unit 14 and undergoes the decompression and decoding processing therein. The decoded image signals are supplied to the image display unit 17 through the synchronization control unit 15, and the still image is thus reconstructed and is displayed.

In order to record a moving image, the compression/decompression unit 14 performs the compression and encoding processing on the image signals sequentially processed by the signal processing unit 13 and transfers the encoded data generated from the moving image sequentially to the image recording unit 18. The encoded data are then recorded in the recording medium. The image recording unit 18 further reads out a data file of the moving image from the recording medium and supplies it to the compression/decompression unit 14, which is then performs decompression and decoding processing thereon. The resulting data is supplied to the image display unit 17 so that the moving image can be displayed.

Figure 2:
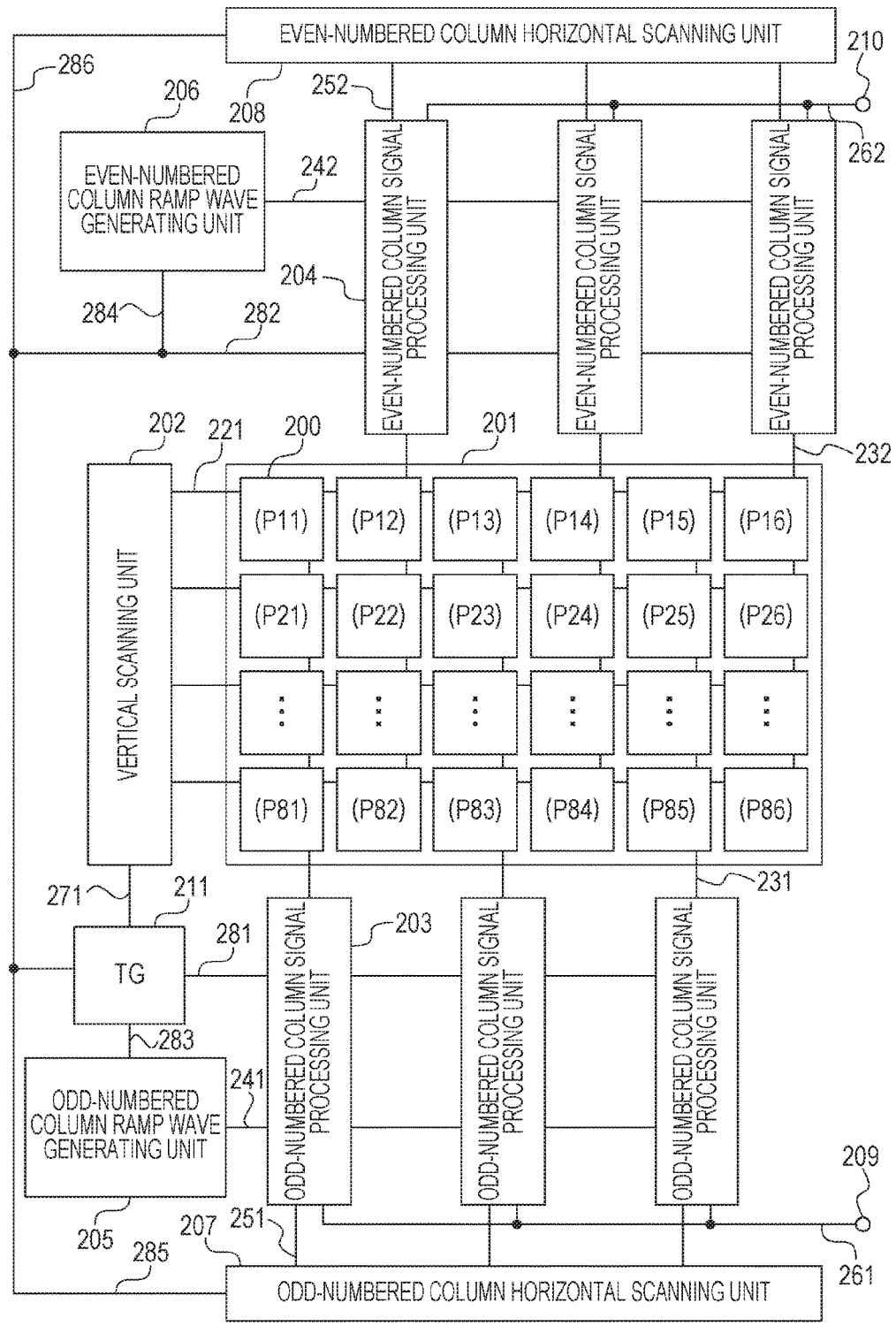
FIG. 2 illustrates a schematic configuration of image pickup devices according to an exemplary embodiment.

FIG. 2 illustrates a schematic configuration of the image pickup device (e.g., a CMOS sensor) 12 according to this exemplary embodiment. As illustrated in FIG. 2, the image pickup device 12 includes a pixel array 201 having a plurality of pixels 200 arranged in a matrix form in a horizontal direction (row direction) and a vertical direction (column direction). Referring to FIG. 2, a pixel 200 of the first row and the first column of the pixel array 201 is indicated by P11, and a pixel of the eighth row and the sixth column is indicated by P86.

An example in which pixels 200 in a 6×8 array (8 rows and 6 columns) according to this exemplary embodiment will be described, but the pixel array 201 is not limited to the pixel array having the numbers of rows and columns. More pixels may be provided in an actual image pickup device. The pixels 200 of an odd-numbered row have an R (red) filter and a G (green) filter alternately while the pixels 200 of an even-numbered row have a G (green) filter and a B (blue) filter alternately. In other words, color filters in a 2×2 Bayer pattern are provided in which RG and GB filters are repeatedly arranged.

A TG (timing generator) 211 outputs a clock signal and a control signal necessary for operations to be performed by the components of the image pickup device 12 based on a control signal from the synchronization control unit 15 in FIG. 1. In this case, the clock signal and the control signal are output through control lines 271, 281, 282, 283, 284, 285, and 286.

A vertical scanning unit 202 selects a row of the pixels 200 in the pixel array 201 and controls driving of a reset operation and a read operation to be performed on the selected pixel row. A pixel control line 221 is commonly connected to each pixel row and transmits a driving control signal for the row from the vertical scanning unit 202.

An odd-numbered column signal line 231 is commonly connected to an odd-numbered pixel column so that signals of odd-numbered column pixels of the row selected by the vertical scanning unit 202 through the pixel control line 221 are read to the corresponding odd-numbered column signal line 231. An even-numbered column signal line 232 is commonly connected to an even-numbered pixel column so that signals of even numbered column pixels of a row selected by the vertical scanning unit 202 through the pixel control line 221 can be read to the corresponding even-numbered column signal line 232.

The odd-numbered column signal processing unit 203 and the even-numbered column signal processing unit 204 are provided for each of the even-numbered column signal lines 231 and odd-numbered column signal lines 232 and execute signal processing, which will be described below, on pixel signals of a selected row transmitted through the respective column signal lines.

An odd-numbered column ramp wave generating unit 205 and an even-numbered column ramp wave generating unit 206 generate ramp wave signals to be used for signal processing to be performed by the corresponding odd-numbered column signal processing units 203 and even-numbered column signal processing units 204 based on a control signal and a clock signal supplied from the TG 211. An odd-numbered column reference signal line 241 and an even-numbered column reference signal line 242 supply the ramp wave signals generated by the odd-numbered column ramp wave generating unit 205 and even-numbered column ramp wave generating unit 206, respectively, to the odd-numbered column signal processing units 203 and even-numbered column signal processing units 204, respectively.

An odd-numbered column horizontal scanning unit 207 selects one of the odd-numbered column signal processing units 203 for each column through an odd-numbered column selection line 251 and controls such that digitized pixel signals stored in the odd-numbered column signal processing unit 203 of each column can be transferred to an odd-numbered column output unit 209 through an odd-numbered column output line 261. An even-numbered column horizontal scanning unit 208 selects one of the even-numbered column signal processing units 204 for each column through an even-numbered column selection line 252 and controls such that digitized pixel signals stored in the even-numbered column signal processing unit 204 of each column can be transferred to an even-numbered column output unit 210 through an even-numbered column output line 262. The odd-numbered column output unit 209 and the even-numbered column output unit 210 output digitized pixel signals row by row to the signal processing unit 13 in FIG. 1.

Figure 3:
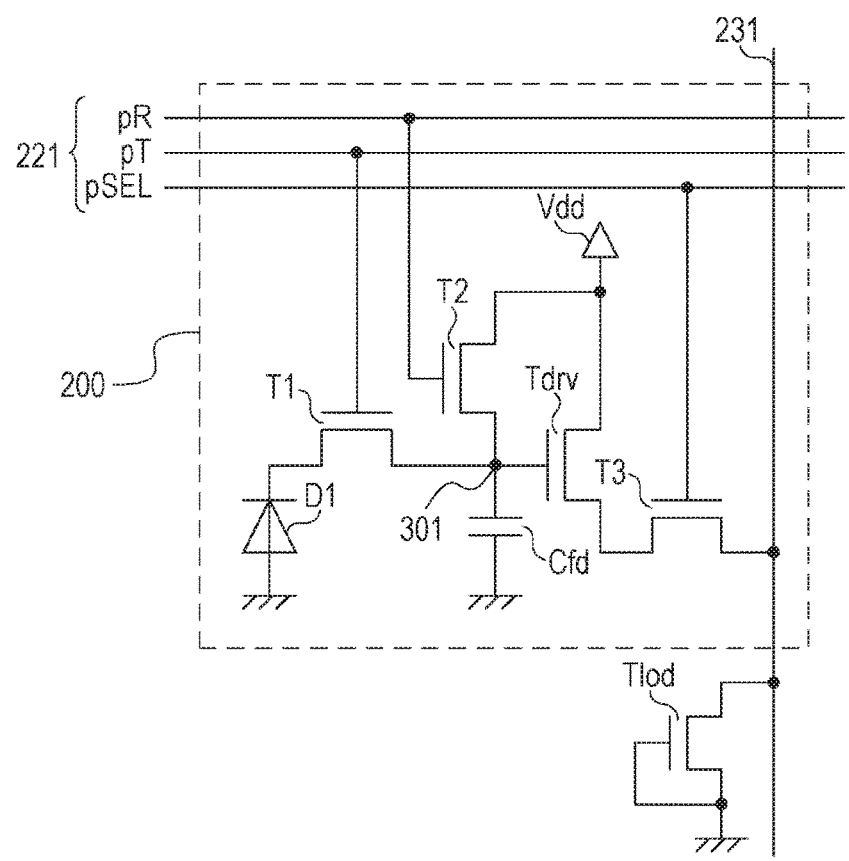
FIG. 3 illustrates a circuit configuration of a pixel according to an exemplary embodiment.

FIG. 3 illustrates a circuit configuration of any one of the pixels 200 in the image pickup device 12 according to this exemplary embodiment. The pixel 200 enclosed by a broken line is a representative one of pixels included in the pixel array 201. The pixel 200 is connected to circuits through pixel control lines 221 and column signal lines 231 and 232. According to this exemplary embodiment, odd-numbered column pixels (such as the pixel P11), for example, are connected to the odd-numbered column signal line 231. Because even numbered column pixels (such as the pixel P12) are connected to the even-numbered column signal line 232, similarly to the odd-numbered column pixels, the repetitive description will be omitted.

The odd-numbered column signal lines 231 is connected to a load circuit and the corresponding odd-numbered column signal processing unit 203 and is commonly connected to odd-numbered column pixels of one column and outputs pixel signals of the odd-numbered column. In the same manner, the even-numbered column signal line 232 is connected to a load circuit and the corresponding even-numbered column signal processing unit 204 and is commonly connected to even-numbered column pixels of one column and outputs pixel signal of the even-numbered column.

The pixel control lines 221 are connected to the vertical scanning unit 202 and are commonly connected to pixels of one corresponding row and control the pixels of the row simultaneously to enable resetting and signal reading. The pixel control lines 221 may include a reset control line to which a control pulse pR is output, a transfer control line to which a control pulse pT is output, and a vertical selection line to which control pulse pSEL is output.

A photoelectric conversion element D1 is a photodiode which converts light to an electric charge and accumulates the converted electric charge and has a PN junction having a P side grounded and an N side connected to a source of a transfer transistor (transfer switch) T1. The transfer transistor (transfer switch) T1 has a gate connected to a transfer control line and a drain connected to an FD capacitor Cfd and controls transfer of the electric charge from the photoelectric conversion element D1 to the FD capacitor Cfd.

The FD capacitor Cfd has one side grounded and accumulates an electric charge when an electric charge transferred from the photoelectric conversion element D1 is converted to voltage. Hereinafter, a connection point between the drain of the transfer transistor (transfer switch) T1 and the other side of the FD capacitor Cfd will be called an FD node 301. A reset transistor (reset switch) T2 has a gate connected to a reset control line, a drain connected to power supply voltage Vdd, and a source connected to the FD capacitor Cfd and resets the electric potential of the FD node 301 to power supply voltage Vdd.

A driving transistor (amplifying unit) Tdrv is a transistor being an amplifier within the pixel. The driving transistor (amplifying unit) Tdrv has a gate connected to the FD capacitor Cfd, a drain connected to power supply voltage Vdd, and a source connected to a drain of a select transistor (selection switch) T3 and outputs voltage according to the voltage of the FD capacitor Cfd.

The select transistor (selection switch) T3 has a gate connected to a vertical selection line pSEL and a source connected to the odd-numbered column signal line 231 and outputs the output from the driving transistor Tdrv as an output signal of the pixel 200 to the odd-numbered column signal line 231.

A load transistor Tlod in a load circuit provided for each of the column signal lines has a source and a gate grounded and a drain connected to the odd-numbered column signal line 231. The load transistor Tlod and a driving transistor Tdrv of the pixel 200 of the column connected through the odd-numbered column signal line 231 form a source follower circuit being an amplifier within the pixel. Normally, when a signal of the pixel 200 is output, the load transistor Tlod is operated as a constant current source with its gate grounded.

According to this exemplary embodiment, a transistor excluding the driving transistor Tdrv and load transistor Tlod functions as a switch. When a control pulse signal to be output to a control line connected to its gate has a High level, the transistor is brought into conduction (ON). When the control pulse signal has a Low level, the transistor cuts off (OFF).

Figure 4:
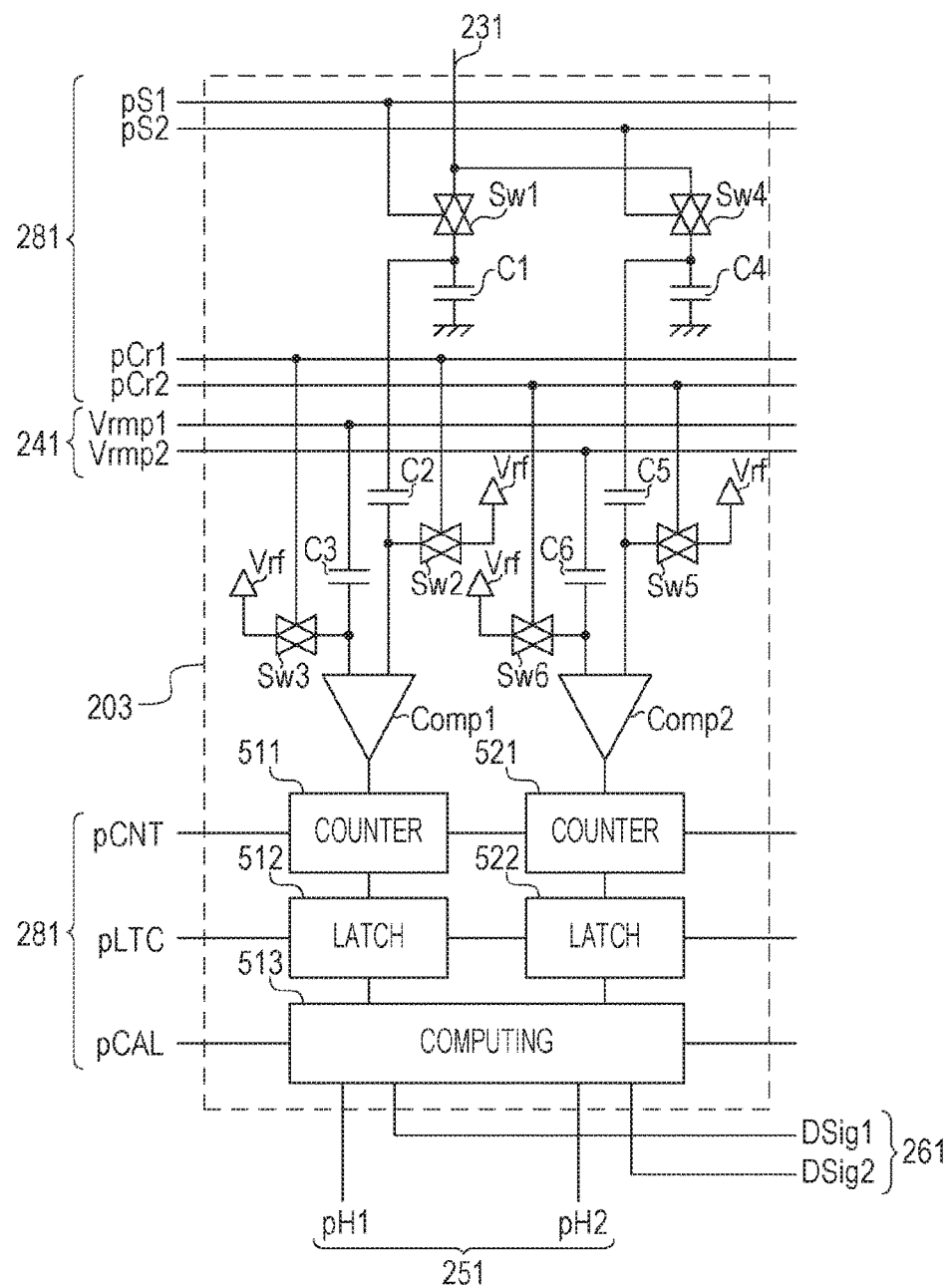
FIG. 4 illustrates a circuit configuration of a column signal processing unit according to a first exemplary embodiment.

FIG. 4 illustrates a circuit configuration of any one of the odd-numbered column signal processing units 203 in the image pickup device 12 according to this exemplary embodiment. According to this exemplary embodiment, the odd-numbered column signal processing unit 203 corresponding to odd-numbered column pixels will be described, for example. Because the configuration of the even-numbered column signal processing unit 204 corresponding to even-numbered column pixels is the same as that of the odd-numbered column signal processing unit 203, the repetitive description will be omitted.

Each of storage capacitors C1 and C4 has one side grounded and receives pixel signals from the corresponding odd-numbered column signal line 231. The conduction/cut-off operations of the selection switches Sw1 and Sw4 are controlled by control pulses pS1 and pS2, respectively, output to the signal selection control line, and a signal received from the odd-numbered column signal line 231 is transferred to the corresponding one of the storage capacitors C1 and C4.

Each of comparators Comp1 and Comp2 compares two inputs and outputs a comparison result. For example, when the high and low relationship of the input two signals is reversed, the level of the output signal is changed from the High level to a Low level so that a comparison result can be output.

Each of coupling capacitors C2 and C5 has one side connected to the corresponding one of the storage capacitors C1 and C4 and the other side connected to one input of the corresponding one of the comparators Comp1 and Comp2. The coupling capacitors C2 and C5 further function as clamp capacitors for performing correlated double sampling (CDS).

Each of coupling capacitors C3 and C6 has one side connected to the corresponding odd-numbered column ramp wave signal line 241 and the other side connected to the other input of the corresponding one of the comparators Comp1 and Comp2.

The conduction/cut-off operations of initialization switches Sw2, Sw3, Sw5, and Sw6 are controlled by control pulses pCr1 and pCr2 output to the corresponding initialization control lines. Initialization voltage Vrf may be input to the comparators Comp1 and Comp2 so that the comparators Comp1 and Comp2 can be initialized.

Counter circuits 511 and 521 execute counter operations based on clock pCNT from the counter control lines and output the current count values in response to signals of comparison results from the corresponding comparators Comp1 and Comp2. The current count values are signals acquired by digitizing pixel signals received through the odd-numbered column signal line 231. The counter circuits 511 and 521 are capable of performing down-count and up-count which are switched in accordance with a clock pCNT supplied from a counter control lines, which can thus be used for noise reduction.

Latch circuits 512 and 522 temporarily hold count values output from the corresponding counter circuits 511 and 521 and output count values held therein in accordance with a control pulse pLTC supplied from a latch control line.

A computing circuit 513 executes a predetermined computing process on count values output by the latch circuits 512 and 522 in accordance with the control pulse pCAL supplied from the corresponding computing control lines. Details of the computing process will be described below. The computing circuit 513 then outputs digital signals DSig1 and DSig2 to the odd-numbered column output line 261 in accordance with control pulses pH1 and pH2 output to the odd-numbered column selection lines 251. The odd-numbered column output line 261 is also commonly connected to the computing circuit 513 in other odd-numbered column signal processing units 203. A digital output line is also commonly connected to the computing circuit in the even-numbered column signal processing units 204 corresponding to even-numbered column pixels.

The control lines 281 from the TG 211 in FIG. 2 include a signal selection control line to which the control pulses pS1 and pS2 are output and an initialization control line to which the control pulses pCr1 and pCr2 are output. The control lines 281 further include a counter control line to which the control pulse pCNT is output, a latch control line to which the control pulse pLTC is output, and a computing control line to which the control pulse pCAL is output.

The odd-numbered column reference signal lines 241 from the odd-numbered column ramp wave generating unit 205 in FIG. 2 include two odd-numbered column ramp wave signal lines to which ramp waves Vrmp1 and Vrmp2 are output. The odd-numbered column selection lines 251 from the odd-numbered column horizontal scanning unit 207 in FIG. 2 include two horizontal selection lines to which the control pulses pH1 and pH2 are output. The odd-numbered column output lines 261 connected to the odd-numbered column output unit 209 in FIG. 2 include two digital output lines to which the digital signals DSig1 and DSig2 are output.

Thus, the odd-numbered column signal processing unit 203 illustrated in FIG. 4 has a circuit configuration capable of performing two-channel analog-digital conversion processing. This exemplary embodiment assumes that each of the switches Sw1 to Sw6 is turned on (ON) when a control pulse signal output to the control line connected thereto has a High level and is turned off (OFF) when it has a Low level.

Figure 5:
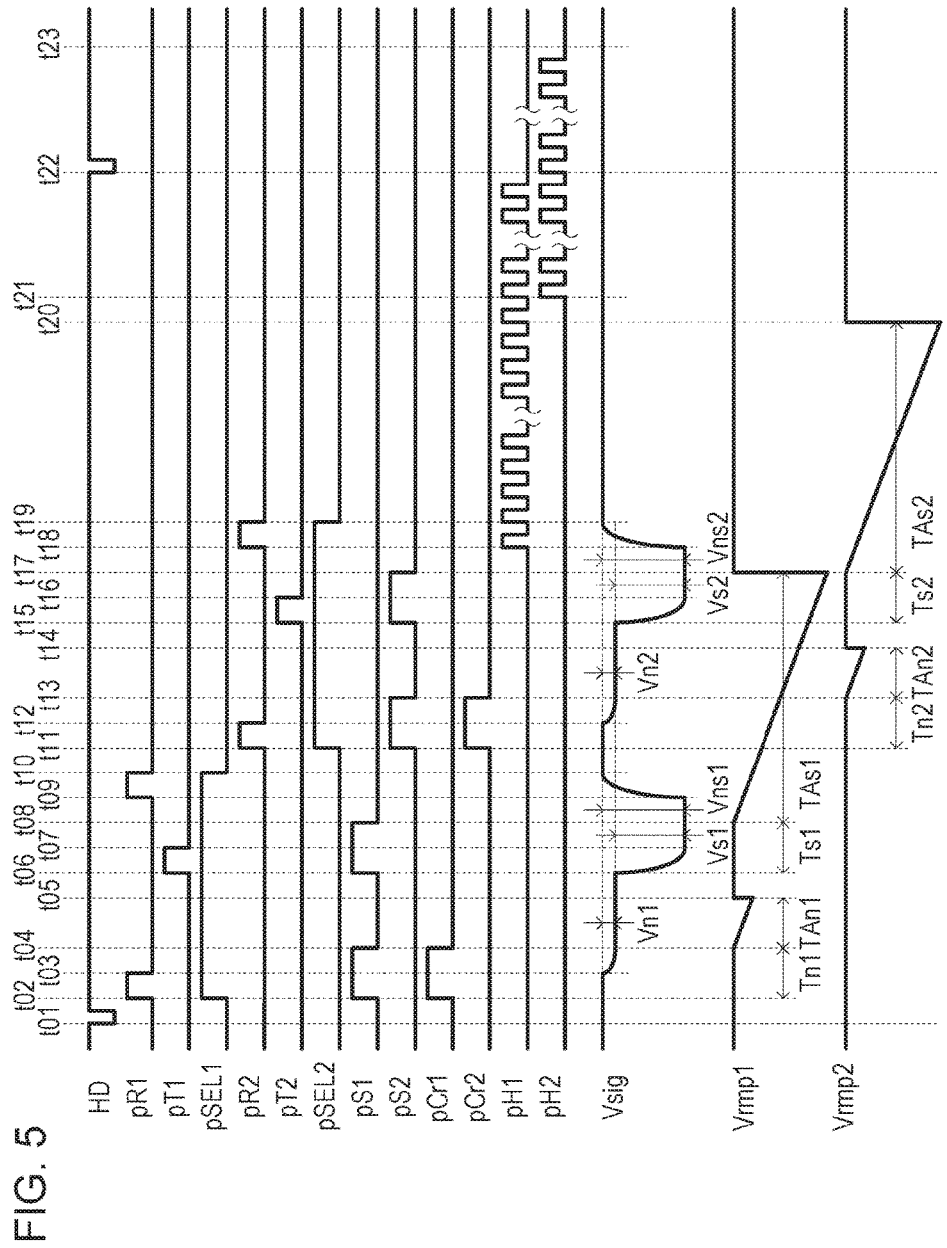
FIG. 5 illustrates overlap-reading operation timing according to the first exemplary embodiment.

FIG. 5 illustrates timing of an overlap-reading operation to be performed in the image pickup device 12 according to this exemplary embodiment. An overlap-reading operation to be performed in the image pickup device 12 according to this exemplary embodiment will be described with reference to FIG. 5.

A case according to this exemplary embodiment will be described in which signals are read out from pixels (such as the pixels P11 and P21) of the odd-numbered column of two serial rows (such as a row including the pixel P11 and a row including the pixel P21, which are in series in the column direction) among the pixels 200 in the pixel array 201. Description regarding the pixel of the even-numbered column (such as the pixel P12 and the pixel P22 which are in series in the column direction) will be omitted. However, the common even-numbered column signal line 232 and even-numbered column signal processing unit 204 may be used to execute an overlap-reading operation in the same manner as performed on the pixels of the odd-numbered column.

From the first pixel P11 in the odd-numbered row and the second pixel P21 in the even-numbered row, an N signal and an S signal are readout where the N signal occurs when the FD node 301 is reset and the S signal occurs when an electric charge of the photoelectric conversion element D1 is transferred to the FD node 301. The common odd-numbered column signal line 231 is used to read out the signal of the first pixel P11 and the signal of the second pixel P21 with a time difference therebetween. The read signals undergo analog-digital conversion, and the digitized pixel signals are output. The overlap-reading operation is repeated on every two rows to read out signals from the pixels in the pixel array 201 so that one photographing operation can be executed.

At a time t01, a horizontal synchronization signal HD is changed to have a Low level. The horizontal synchronization signal HD indicates a time point when the horizontal synchronization period starts in which signals are read out from the pixels 200 of each row provided in the pixel array 201.

At a time t02, a control pulse pR1 for the reset control line for the pixels of the first row including the pixel P11 is changed to have a High level to turn on the reset transistor T2 so that the electric potential of the FD node 301 is reset to power supply voltage Vdd. At the same time, a control pulse pSEL1 for the vertical selection line is changed to have a High level to turn on the select transistor T3 so that the source follower circuit is operated. Thus, the voltage corresponding to the electric potential of the FD node 301 is output to the odd-numbered column signal line 231.

At the same time, a control pulse pS1 for the signal selection control line is changed to have a High level to turn on the selection switch Sw1. Thus, the signal output to the odd-numbered column signal line 231 is transmitted to the storage capacitor C1. Further at the same time, a control pulse pCr1 for the initialization control line is changed to have a High level to turn on the initialization switches Sw2 and Sw3. Thus, the input of the comparator Comp1 is set to initialization voltage Vrf.

At a time t03, a control pulse pR1 for the reset control line is changed to have a Low level to turn off the reset transistor T2. After that, the processing waits until the signal level output to the odd-numbered column signal line 231 becomes stable. Here, a signal Vsig output from the pixel P11 is an N signal Vn1 which is the signal having reset the FD node 301.

At a time t04 when the signal level of the N signal Vn1 output to the odd-numbered column signal line 231 becomes stable, the control pulse pS1 for the signal selection control line is changed to have a Low level to turn off the selection switch Sw1. Thus, the N signal Vn1 is held in the storage capacitor C1.

At the same time, the control pulse pCr1 for the initialization control line is changed to have a Low level to turn off the initialization switches Sw2 and Sw3. Thus, the initialization of the input electric potential of the comparator Comp1 ends. Here, the coupling capacitor C2 should hold a potential difference corresponding to the difference between the initialization voltage Vrf and the N signal Vn1. The coupling capacitor C3 should hold a potential difference corresponding to the difference between the initialization voltage Vrf and the voltage of the odd-numbered column ramp wave signal line before the ramp wave Vrmp1 occurs.

The period from the time t02 to the time t04 described above will be called a storage operation period Tn1 for the N signal Vn1 of the pixel P11. At and after the time t04, AD conversion is performed on the N signal Vn1.

First, at the time t04, under control of the TG 211, the ramp wave Vrmp1 is output from the odd-numbered column ramp wave generating unit 205 to the odd-numbered column ramp wave signal line 241. Here, the coupling capacitor C3 holds the potential difference corresponding to the difference between the initialization voltage Vrf and the voltage of the odd-numbered column ramp wave signal line 241 before the ramp wave Vrmp1 occurs. Thus, as an amount of change with respect to the initialization voltage Vrf, the ramp wave Vrmp1 is input to the comparator Comp1.

The coupling capacitor C2 holds the potential difference corresponding to the difference between the initialization voltage Vrf and the N signal Vn1. Thus, as an amount of change with respect to the initialization voltage Vrf, the N signal Vn1 is input to the comparator Comp1. The comparator Comp1 then compares between the input N signal Vn1 and the ramp wave Vrmp1.

At that time, because the input of the comparator Comp1 corresponding to the N signal Vn1 is initialized to the initialization voltage Vrf, a signal corresponding to the difference as described above should not be present ideally. However, in reality, a noise component n occurs due to a fluctuation caused by switching noise of the selection switch Sw1 and a variation of the comparator Comp1. A sum of the initialization voltage Vrf and the noise component n is digitized as the N signal Vn1. It may be assumed that fluctuations caused by switching noise of the initialization switches Sw2 and Sw3 may occur equally at the two inputs of the comparator Comp1 and are cancelled in the comparison. Thus, the fluctuations are not considered here.

Simultaneously with the output of the ramp wave Vrmp1, under control of the TG 211, the counter circuit 511 is set to down-count through the control pulse pCNT output to the counter control line, and a counting operation starts. At a time t05, the output of the ramp wave Vrmp1 ends.

Here, the ramp wave Vrmp1 may have an amplitude enough for the amplitude of the N signal Vn1 to be input to the comparator Comp1. Accordingly, a possible maximum value of the N signal (voltage level of voltage acquired by adding the noise component n to the initialization voltage Vrf) may be measured in advance, and the amplitude of the ramp wave Vrmp1 may be set for the odd-numbered column ramp wave generating unit 205.

At some point between the times t04 and t05, the signal level of the ramp wave Vrmp1 to be input to the comparator Comp1 and the signal level of the N signal Vn1 (voltage level of voltage acquired by adding the noise component n to the initialization voltage Vrf) are matched. When the signal level of the ramp wave Vrmp1 and the signal level of the N signal Vn1 are matched, a comparison result signal is output from the comparator Comp1 to the counter circuit 511. The counter circuit 511 having received the comparison result signal stops its counter operation in response thereto and holds the current count value by keeping the state of the counter.

The period from the time t04 to the time t05 described above will be called an AD conversion period TAn1 of the N signal Vn1 for the pixel P11. The period is a storage period in which the N signal Vn1 before the AD conversion is required to be held in the storage capacitor C1.

Next, at a time t06, the control pulse pT1 for the transfer control line is changed to have a High level to turn on the transfer transistor T1. Thus, the electric charge accumulated in the photoelectric conversion element D1 is transferred to the FD node 301 and is output as a signal of the photoelectric conversion element D1 to the odd-numbered column signal line 231. At the same time, the control pulse pS1 for the signal selection control line is changed to have a High level to turn on the selection switch Sw1. Thus, the signal of the photoelectric conversion element D1 output to the odd-numbered column signal line 231 is transmitted to the storage capacitor C1.

Next, at a time t07, the control pulse pT1 for the transfer control line is changed to have a Low level to turn off the transfer transistor T1. After that, the processing waits until the signal level output to the odd-numbered column signal line 231 becomes stable. The signal Vsig output from the pixel P11 is the N+S signal Vns1 acquired by adding the signal Vs1 as a result of the readout of the electric charge in the photoelectric conversion element D1 to the N signal Vn1.

At a time t08 when the signal level of the N+S signal Vns1 output to the odd-numbered column signal line 231 becomes stable, the control pulse pS1 for the signal selection control line is changed to have a Low level to turn off the selection switch Sw1. Thus, the N+S signal Vns1 is held in the storage capacitor C1. The period from the time t06 to the time t08 described above will be called a storage operation period Ts1 of the N+S signal Vns1.

At a time t09, the control pulse pR1 for the reset control line is changed to have a High level to turn on the reset transistor T2. Thus, the electric potential of the FD node 301 is reset to the power supply voltage Vdd. Thus, the odd-numbered column signal line 231 is also reset. At the time t10 when the electric potential of the FD node 301 is sufficiently reset, the control pulse pR1 for the reset control line is changed to have a Low level to turn off the reset transistor T2. At the same time, the control pulse pSEL1 for the vertical selection line is changed to have a Low level to turn off the select transistor T3. Thus, pixels of the first row including the pixel P11 is electrically isolated from the odd-numbered column signal line 231. Then, the charge accumulation to be performed by the photoelectric conversion element D1 for the next frame is started in the pixels of the first row including the pixel P11.

At and after the time t08, AD conversion is executed on the S signal Vs1 input to the comparator Comp1. First of all, at the time t08, under control of the TG 211, the ramp wave Vrmp1 is output from the odd-numbered column ramp wave generating unit 205 to the odd-numbered column ramp wave signal line 241.

Here, like the AD conversion performed on the N signal Vn1, the ramp wave Vrmp1 is input as an amount of change with respect to the initialization voltage Vrf to the comparator Comp1 through the coupling capacitor C3. When the N+S signal Vns1 is input to the comparator Comp1 through the coupling capacitor C2, the coupling capacitor C2 holds the potential difference corresponding to the difference between the initialization voltage Vrf and the N signal Vn1. Thus, the S signal Vs1 being the difference between the N+S signal Vns1 and the N signal Vn1 is input to the comparator Comp1 as a signal corresponding to the electric charge of the photoelectric conversion element D1. In other words, a correlated double sampling is implemented which uses the coupling capacitor C2 for a clamp operation. The comparator Comp1 then compares between the input S signal Vs1 and the ramp wave Vrmp1.

Here, like the AD conversion performed on the N signal Vn1, the S signal Vs1 to which a noise component n caused by a fluctuation of the switching noise of the selection switch Sw1 and a variation of the comparator Comp1 is added is digitized.

Simultaneously with the output of the ramp wave Vrmp1, under control of the TG 211, the counter circuit 511 is set to up-count through the control pulse pCNT output to the counter control line and starts a counting operation from the count value stopped upon AD conversion performed on the N signal Vn1. At a time t17, the output of the ramp wave Vrmp1 ends.

The ramp wave Vrmp1 generated here has the same slope as that of the N signal Vn1 upon AD conversion and may be required to have a sufficient amplitude for the amplitude of the S signal Vs1 input to the comparator Comp1. Accordingly, a possible maximum value of the S signal may be measured in advance, and the amplitude of the ramp waves Vrmp1 may be set for the odd-numbered column ramp wave generating unit 205.

At some point between the times t08 to t17, the signal level of the ramp wave Vrmp1 input to the comparator Comp1 and the signal level of the S signal Vs1 are matched. When the signal level of the ramp wave Vrmp1 and the signal level of the S signal Vs1 are matched, a comparison result signal is output from the comparator Comp1 to the counter circuit 511. The counter circuit 511 having received the comparison result signal stops is counting operation in response thereto and outputs the current count value and the latch signal to the latch circuit 512.

Here, the counter circuit 511 starts from the count value of the N signal Vn1 (corresponding to the voltage level of the sum of the initialization voltage Vrf and the noise component n) down counted in advance. Because the S signal Vs1 containing the noise component n is up-counted, the count value of the S signal Vs1 having the noise component n cancelled can be counted. The latch circuit 512 having received the latch signal temporarily holds the current count value.

In response to the completion of the output of the ramp wave Vrmp1 at the time t17, the count value held by the latch circuit 512 is transferred to the computing circuit 513 through the control pulse pLTC output from the TG 211 to the latch control line and the control pulse pCAL output to the computing control line. Then, the count value is stored as the digital S signal Ds1 of the pixel P11. In other words, the computing circuit 513 stores the digital S signal Ds1 and operates as a memory which outputs it as it is in response to a request therefor through the horizontal selection line.

The period from the time t08 to t17 will be called an AD conversion period TAs1 of the S signal Vs1 of the pixel P11. This period is a storage period in which the N+S signal Vns1 before the AD conversion is required to be held in the storage capacitor C1.

In the column signal processing operation performed on the first row as described above, signals of the pixels of the first row including the pixel P11 are read by the corresponding odd-numbered column signal processing units 203, undergo AD conversion, and are stored as digital signals in the computing circuit 513.

Next, the period from a time t18 to a time t22 is a horizontal output operation period for the first row, and the digital S signals of the pixels of the first row stored in the computing circuit 513 are output. In the period from the time t18 to the time t22, the TG 211 controls the odd-numbered column horizontal scanning unit 207 through the control line 285 so as to generate a control pulse pH1 for selecting the odd-numbered column signal processing units 203 in a predetermined order through the odd-numbered column selection line 251. Then, the digital S signals DSig1 of the pixels of the first row stored in the computing circuit 513 for the selected odd-numbered column signal processing unit 203 are output to the odd-numbered column output line 261.

At a time t11 when the S signals Vs1 undergo AD conversion, an operation for reading signals from pixels of the second row including the pixel P21 starts.

At the time t11, the control pulse pR2 for the reset control line for pixels of the second row including the pixel P21 is changed to have a High level to turn on the reset transistor T2. Thus, the electric potential of the FD node 301 is reset to the power supply voltage Vdd. At the same time, the control pulse pSEL2 for the vertical selection line is changed to have a High level to turn on the select transistor T3. Thus, the source follower circuit is operated, and voltage corresponding to the electric potential of the FD node 301 is output to the odd-numbered column signal line 231.

At the same time, the control pulse pS2 for the signal selection control line is changed to have a High level to turn on the selection switch Sw4. Thus, the signals output to the odd-numbered column signal line 231 are transmitted to the storage capacitor C4. Furthermore at the same time, the control pulse pCr2 for the initialization control line is changed to have a High level to turn on the initialization switches Sw5 and Sw6. Thus, the input of the comparator Comp2 is set to the initialization voltage Vrf.

At a time t12, the control pulse pR2 for the reset control line is changed to have a Low level to turn off the reset transistor T2. After that, the processing waits until the signal level output to the odd-numbered column signal line 231 becomes stable. The signal Vsig output from the pixel P21 is an N signal Vn2 which is a signal after resetting the FD node 301.

At a time t13 when the signal level of the N signal Vn2 output to the odd-numbered column signal line 231 becomes stable, the control pulse pS2 for the signal selection control line is changed to have a Low level to turn off the selection switch Sw4. Thus, the N signal Vn2 is held in the storage capacitor C4.

At the same time, the control pulse pCr2 for the initialization control line is changed to have a Low level to turn off the initialization switches Sw5 and Sw6. Thus, the initialization of the input electric potential of the comparator Comp2 ends. At this time, the coupling capacitor C5 should hold the potential difference corresponding to the difference between the initialization voltage Vrf and the N signal Vn2. The coupling capacitor C6 should hold the potential difference corresponding to the difference between the initialization voltage Vrf and the voltage of the odd-numbered column ramp wave signal line before the ramp wave Vrmp2 occurs.

The period from the time t11 to the time t13 described above will be called a storage operation period Tn2 of the N signal Vn2 of the pixel P21. At and after time t13, AD conversion is performed on the N signal Vn2.

First, at the time t13, under control of the TG 211, a ramp wave Vrmp2 is output from the odd-numbered column ramp wave generating unit 205 to the odd-numbered column ramp wave signal line 241. At that time, the coupling capacitor C6 holds the potential difference corresponding to the difference between the initialization voltage Vrf and the voltage of the odd-numbered column ramp wave signal line 241 before the ramp wave Vrmp2 occurs. Thus, as an amount of change with respect to the initialization voltage Vrf, the ramp wave Vrmp2 is input to the comparator Comp2.

The coupling capacitor C2 holds the potential difference corresponding to the difference between the initialization voltage Vrf and the N signal Vn2. Thus, as an amount of change with respect to the initialization voltage Vrf, the N signal Vn2 is input to the comparator Comp2. The comparator Comp2 then compares the input N signal Vn2 and the ramp waves Vrmp2.

At that time, because the input of the comparator Comp2 corresponding to the N signal Vn2 is initialized to the initialization voltage Vrf, a signal corresponding to a difference should not be present ideally. However, in reality, a noise component n occurs due to a fluctuation caused by switching noise of the selection switch Sw4 and a variation of the comparator Comp2. A sum of the initialization voltage Vrf and the noise component n is digitized as the N signal Vn2. It may be assumed that fluctuations caused by switching noise of the initialization switches Sw5 and Sw6 may occur equally at the two inputs of the comparator Comp2 and are cancelled in the comparison. Thus, the fluctuations are not considered here.

Simultaneously with the output of the ramp wave Vrmp2, under control of the TG 211, the counter circuit 521 is set to down-count through the control pulse pCNT output to the counter control line, and a counting operation starts. At a time t14, the output of the ramp wave Vrmp2 ends.

Here, the ramp wave Vrmp2 may have an amplitude enough for the amplitude of the N signal Vn2 to be input to the comparator Comp2. Accordingly, a possible maximum value of the N signal (voltage level of voltage acquired by adding the noise component n to the initialization voltage Vrf) may be measured in advance, and the amplitude of the ramp wave Vrmp2 may be set for the odd-numbered column ramp wave generating unit 205.

At some point between the times t13 and t14, the signal level of the ramp wave Vrmp2 to be input to the comparator Comp2 and the signal level of the N signal Vn2 (voltage level of voltage acquired by adding the noise component n to the initialization voltage Vrf) are matched. When the signal level of the ramp wave Vrmp2 and the signal level of the N signal Vn2 are matched, a comparison result signal is output from the comparator Comp2 to the counter circuit 521. The counter circuit 521 having received the comparison result signal stops its counter operation in response thereto and holds the current count value by keeping the state of the counter.

The period from the time t13 to the time t14 described above will be called an AD conversion period TAn2 of the N signal Vn2 for the pixel P21. The period is a storage period in which the N signal Vn2 before the AD conversion is required to be held in the storage capacitor C4.

Next, at a time t15, the control pulse pT2 for the transfer control line is changed to have a High level to turn on the transfer transistor T1. Thus, the electric charge accumulated in the photoelectric conversion element D1 is transferred to the FD node 301 and is output as a signal of the photoelectric conversion element D1 to the odd-numbered column signal line 231. At the same time, the control pulse pS2 for the signal selection control line is changed to have a High level to turn on the selection switch Sw4. Thus, the signal of the photoelectric conversion element D1 output to the odd-numbered column signal line 231 is transmitted to the storage capacitor C1.

Next, at a time t16, the control pulse pT2 for the transfer control line is changed to have a Low level to turn off the transfer transistor T1. After that, the processing waits until the signal level output to the odd-numbered column signal line 231 becomes stable. The signal Vsig output from the pixel P21 is the N+S signal Vns2 acquired by adding the signal Vs2 as a result of the readout of the electric charge in the photoelectric conversion element D1 to the N signal Vn2.

At a time t17 when the signal level of the N+S signal Vns2 output to the odd-numbered column signal line 231 becomes stable, the control pulse pS2 for the signal selection control line is changed to have a Low level to turn off the selection switch Sw4. Thus, the N+S signal Vns2 is held in the storage capacitor C4. The period from the time t15 to the time t17 described above will be called a storage operation period Ts2 of the N+S signal Vns2.

At a time t18, the control pulse pR2 for the reset control line is changed to have a High level to turn on the reset transistor T2. Thus, the electric potential of the FD node 301 is reset to the power supply voltage Vdd. Thus, the odd-numbered column signal line 231 is also reset. At the time t19 when the electric potential of the FD node 301 is sufficiently reset, the control pulse pR2 for the reset control line is changed to have a Low level to turn off the reset transistor T2. At the same time, the control pulse pSEL2 for the vertical selection line is changed to have a Low level to turn off the select transistor T3. Thus, pixels of the second row including the pixel P21 is electrically isolated from the odd-numbered column signal line 231. Then, the charge accumulation to be performed by the photoelectric conversion element D1 for the next frame is started in the pixels of the second row including the pixel P21.

At and after the time t17, AD conversion is executed on the S signal Vs2 input to the comparator Comp2. First of all, at the time t17, under control of the TG 211, the ramp wave Vrmp2 is output from the odd-numbered column ramp wave generating unit 205 to the odd-numbered column ramp wave signal line 241.

Here, like the AD conversion performed on the N signal Vn2, the ramp wave Vrmp2 is input as an amount of change with respect to the initialization voltage Vrf to the comparator Comp2 through the coupling capacitor C6. When the N+S signal Vns2 is input to the comparator Comp2 through the coupling capacitor C5, the coupling capacitor C5 holds the potential difference corresponding to the difference between the initialization voltage Vrf and the N signal Vn2. Thus, the S signal Vs2 being the difference between the N+S signal Vns2 and the N signal Vn2 is input to the comparator Comp2 as a signal corresponding to the electric charge of the photoelectric conversion element D1. In other words, a correlated double sampling is implemented which uses the coupling capacitor C5 for a clamp operation. The comparator Comp2 then compares between the input S signal Vs2 and the ramp wave Vrmp2.

Here, like the AD conversion performed on the N signal Vn2, the S signal Vs1 to which a noise component n caused by a fluctuation of the switching noise of the selection switch Sw4 and a variation of the comparator Comp2 is added is digitized.

Simultaneously with the output of the ramp wave Vrmp2, under control of the TG 211, the counter circuit 521 is set to up-count through the control pulse pCNT output to the counter control line and starts a counting operation from the count value stopped upon AD conversion performed on the N signal Vn2. At a time t20, the output of the ramp wave Vrmp2 ends.

The ramp wave Vrmp2 generated here has the same slope as that of the N signal Vn2 upon AD conversion and may be required to have a sufficient amplitude for the amplitude of the S signal Vs2 input to the comparator Comp2. Accordingly, a possible maximum value of the S signal may be measured in advance, and the amplitude of the ramp wave Vrmp2 may be set for the odd-numbered column ramp wave generating unit 205.

At some point between the times t17 to t20, the signal level of the ramp wave Vrmp2 input to the comparator Comp2 and the signal level of the S signal Vs2 are matched. When the signal level of the ramp wave Vrmp2 and the signal level of the S signal Vs2 are matched, a comparison result signal is output from the comparator Comp2 to the counter circuit 521. The counter circuit 521 having received the comparison result signal stops is counting operation in response thereto and outputs the current count value and the latch signal to the latch circuit 522.

Here, the counter circuit 521 starts from the count value of the N signal Vn2 (corresponding to the voltage level of the sum of the initialization voltage Vrf and the noise component n) down counted in advance. Because the S signal Vs2 containing the noise component n has been up-counted, the count value of the S signal Vs2 in which the noise component n has been cancelled can be counted. The latch circuit 522 having received the latch signal temporarily holds the current count value.

In response to the completion of the output of the ramp wave Vrmp2 at the time t20, the count value held by the latch circuit 522 is transferred to the computing circuit 513 through the control pulse pLTC output from the TG 211 to the latch control line and the control pulse pCAL output to the computing control line. Then, the count value is stored as the digital S signal Ds2 of the pixel P21. In other words, the computing circuit 513 stores the digital S signal Ds2 and operates as a memory which outputs it as it is in response to a request therefor through the horizontal selection line.

The period from the time t17 to t20 will be called an AD conversion period TAs2 of the S signal Vs2 of the pixel P21. This period is a storage period in which the N+S signal Vns2 before the AD conversion is required to be held in the storage capacitor C4.

In the column signal processing operation performed on the second row as described above, signals of the pixels of the second row including the pixel P21 are read by the corresponding odd-numbered column signal processing units 203, undergo AD conversion, and are stored as digital signals in the computing circuit 513.

Next, the period from the time t21 to the time t23 is a horizontal output operation period for the second row, and the digital S signals of the pixels of the second row stored in the computing circuit 513 are output. In the period from the time t21 to the time t23, the TG 211 controls the odd-numbered column horizontal scanning unit 207 through the control line 285 so as to generate a control pulse pH2 for selecting the odd-numbered column signal processing units 203 in a predetermined order through the odd-numbered column selection line 251. Then, the digital S signals DSig2 of the pixels of the second row stored in the computing circuit 513 for the selected odd-numbered column signal processing unit 203 are output to the odd-numbered column output line 261.

As described above, the pixels of the first row including the pixel P11 and pixels of the second row including the pixel P21 use the common odd-numbered column signal line 231 in time-division manner so that an overlap-reading operation can be performed on pixel signals. Because the odd-numbered column signal processing unit 203 is capable of performing two-channel AD conversions, the two-channel AD conversions are executed with a time difference between pixel reading operations performed on the pixel signals of the first row and the pixel signals of the second row. Because the odd-numbered column output line 261 also includes two-channel digital output lines, the digital S signals of the pixels of the first row and pixels of the second row, which are stored in the computing circuit 513, are also output with a time difference therebetween.

As described above, digital S signals of pixels of two rows with a time difference are output from the odd-numbered column signal processing units 203 selected in a predetermined order, are output in parallel from the odd-numbered column output unit 209 through the two-channel digital output lines. Then, the output of the signals of the pixels of the two rows completes.

At the time t11 when S signals Vs1 of pixels of the first row are undergoing AD conversion in the overlap-reading operation, N signals Vn2 of pixels of the second row are output to the odd-numbered column signal line 231. At that time, the AD conversion period TAs1 when the S signals Vs1 of pixels of the first row are stored and the storage operation period Tn2 of the N signals Vn2 of pixels of the second row overlap at least partially with a common period therein.

The AD conversion period TAs1 when the S signals Vs1 of pixels of the first row are stored and the AD conversion period TAn2 of the N signals Vn2 of pixels of the second row overlap at least partially with a common period therein. At the time t15 when S signals Vs1 of pixels of the first row are undergoing AD conversion, the S signals Vs2 of pixels of the second row are output to the odd-numbered column signal line 231.

At that time, the AD conversion period TAs1 when the S signals Vs1 of pixels of the first row are stored and the storage operation period Ts2 of the S signals Vs2 of pixels of the second row overlap at least partially with a common period therebetween. This can reduce the horizontal synchronization period, compared with a case where the readout and AD conversion of the N signals Vn1 and S signals Vs1 of pixels of the first row and the readout and AD conversion of the N signals Vn2 and S signals Vs2 of pixels of the second row are sequentially performed. Therefore, the frame rate in the overlap-reading operation can be improved.

After the output of pixel signals of the first row completes, the read operation is started to be performed on the third row in response to the horizontal synchronization signal at a time t22. Because this is the same operation as the one performed on the first row, it is not illustrated in FIG. 5. The operation having described up to this point is performed on every two rows with a delay therebetween from the starting row in synchronization with the horizontal synchronization signal, and pixel signals of the rows are sequentially output. Therefore, the exposure periods of the rows are shifted in time row by row.

Then, by repeating the operation in one horizontal synchronization period from the time t01 to the time t22 for every two rows, signals of every two rows of pixels of the pixel array 201 can be read out.

Figure 6:
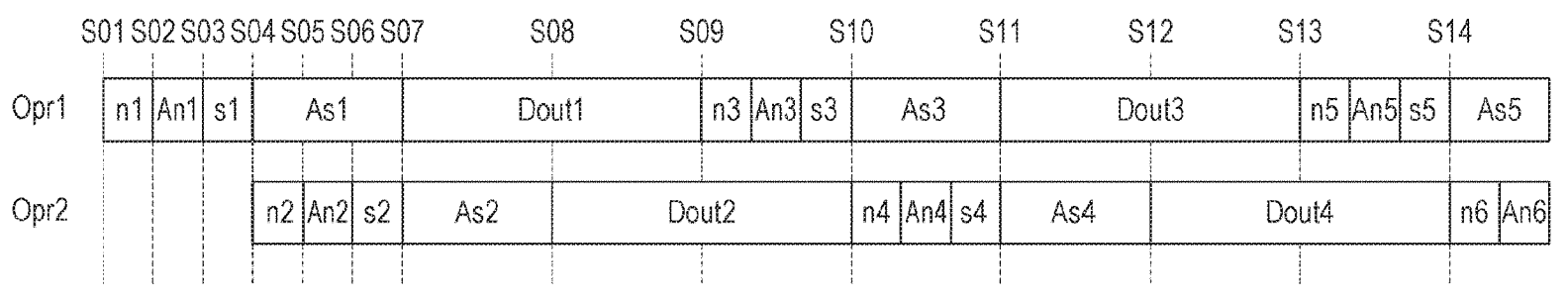

FIG. 6 illustrates serial operations in the overlap-reading operation to be performed in the image pickup device 12 according to this exemplary embodiment. An operation Opr1 includes readout from pixels of an odd-numbered row to output of digital pixel signals DSig1 from the odd-numbered row through the corresponding digital output line. An operation Opr2 includes readout from pixels of an even-numbered row to output of digital pixel signals DSig2 from the even-numbered row through the corresponding digital output line.

It is assumed that pixels of a row k are to be read out in the pixel array 201. The storage operation period Tnk and AD conversion period TAnk of an N signal Vnk of the kth row and the storage operation period Tsk and AD conversion period TAsk of an S signal Vsk of the kth row in FIG. 5 are schematically indicated as nk, Ank, sk, and Ask, respectively, in FIG. 6.

The horizontal output operation period for the first row at times t18 to t22 and the horizontal output operation period for the second row at times t21 to t23 in FIG. 5 are also indicated as horizontal output operation periods Doutk for the kth row corresponding to FIG. 5.

Referring to FIG. 6, the period from a time s01 to a time s04 of the operation Opr1 corresponds to an operation period in which signals of pixels of the first row are read to the odd-numbered column signal line 231. The period from the time s04 to a time s07 of the operation Opr2 corresponds to an operation period in which signals of pixels of the second row are read to the odd-numbered column signal line 231. This is implemented by performing a pixel reading operation using the common odd-numbered column signal line 231 in a time division manner on the pixels of the first row and the pixels of the second row as illustrated in FIG. 5.

Then, when the horizontal synchronization signals HD are output at times 01, s09, and s13, the operation Opr1 reads out signals from pixels of an odd-numbered row in synchronization with the horizontal synchronization signals HD. Then, the operation Opr2 can read out signals from the pixels of an even-numbered row at times s04, s10, and s14 which are differentiated from the time points of the operation period when signals of pixels of the odd-numbered row are read to the odd-numbered column signal line 231. It may be understood from this that the overlap-reading operation which reads out signals of pixels of every two rows in the pixel array 201 can be serially performed.

Figure 7:
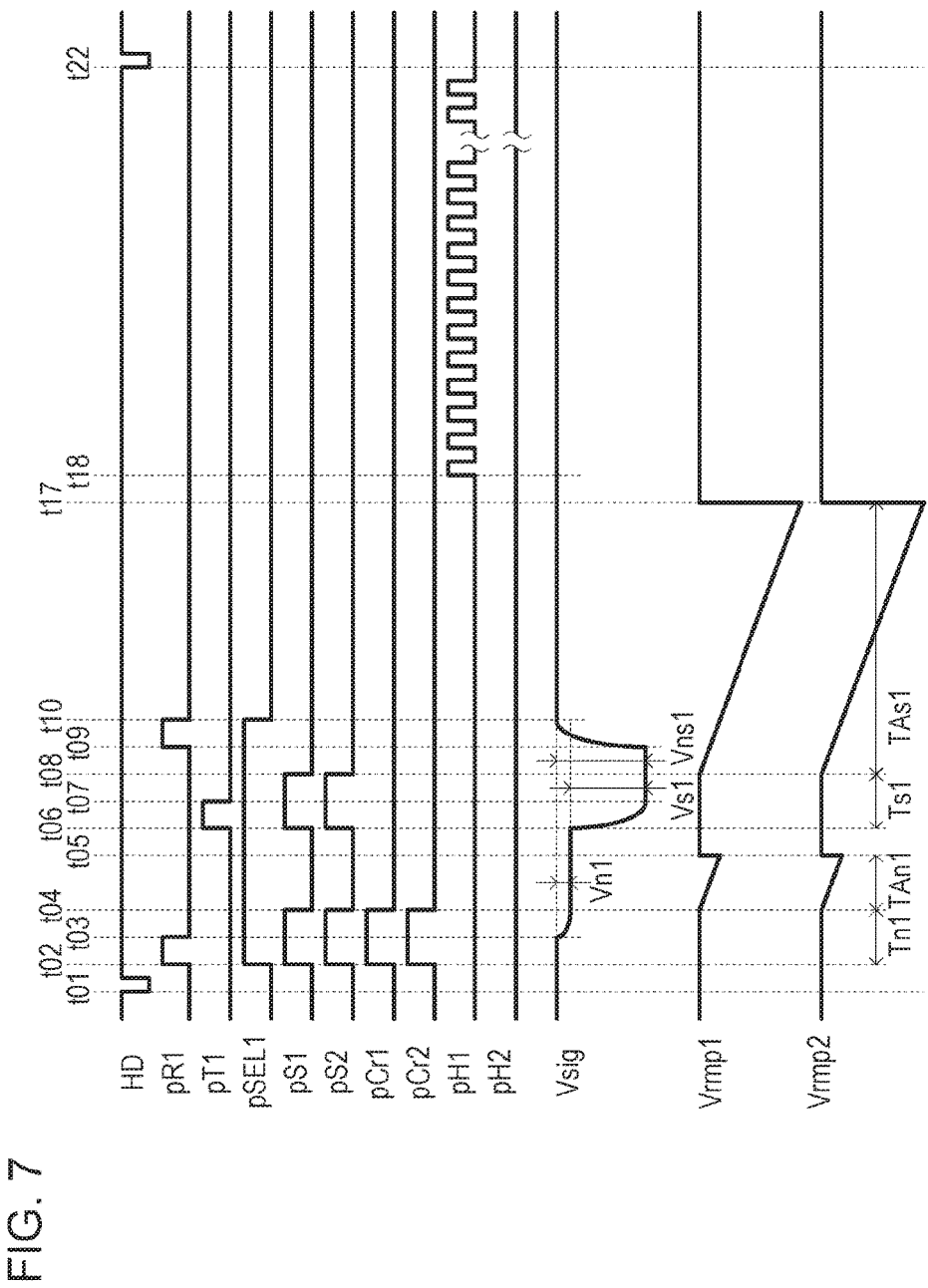
FIG. 7 illustrates noise reduction operation timing according to the first exemplary embodiment.

FIG. 7 illustrates timing of a noise reduction operation to be performed by the image pickup device 12 according to this exemplary embodiment. FIG. 7 illustrates a noise reduction operation by using the same references and the same time points as those in FIG. 5.

The noise reduction operation reads out N signals which have reset the FD node 301 and S signals which have read out the electric charges of the photoelectric conversion element D1 in the FD node 301 from the pixels of the first row. Then, analog-digital conversion processing is performed on the signals of the pixel of the first row read by using the odd-numbered column signal line 231, and the digitized pixel signals are output.

At that time, because the odd-numbered column signal processing unit 203 is capable of performing two-channel analog-digital conversion processing, the two-channel analog-digital conversion processing is performed on the signals of pixels of the first row. A predetermined computing operation is performed on the results of the two-channel analog-digital conversion in the computing circuit 514, and the results are output therefrom. Reading out signals from pixels in the pixel array 201 by repeating the noise reduction operation can implement one photographing operation.

At a time t01, after a lapse of a preset exposure period, a horizontal synchronization period for performing the noise reduction operation starts. Because the operation for reading signals from pixels of the first row including the pixel P11 in the period from the time t02 to the time t10 is the same as the one in FIG. 5, detail descriptions will be omitted.

First of all, at a time t02, a control pulse pR1 to be output to the reset control line and a control pulse pSEL1 to be output to the vertical selection line are changed to have a High level. Then, the electric potential of the FD node 301 is reset, and voltage corresponding to the reset electric potential is output to the odd-numbered column signal line 231.

At the same time, the control pulses pS1 and pS2 to be output to the signal selection control lines are changed to have a High level to turn on the selection switches Sw1 and Sw4. Thus, the signals output to the odd-numbered column signal lines 231 are transmitted to the storage capacitors C1 and C4.

Further at the same time, the control pulses pCr1 and pCr2 to be output to the initialization control lines are changed to have a High level to turn on the initialization switches Sw2, Sw3, Sw5, and Sw6. Thus, the inputs of the comparators Comp1 and Comp2 are set to initialization voltage Vrf.

Next, at a time t03, after the control pulse pR1 to be output to the reset control line is changed to have a Low level, the processing waits until the signal level of the N signal Vn1 of the pixel P11 output to the odd-numbered column signal line 231 becomes stable. At a time t04 when the signal level of the N signal Vn1 becomes stable, control pulses pS1 and pS2 to be output to the signal selection control lines are changed to have a Low level to turn off the selection switches Sw1 and Sw4. Thus, the N signals Vn1 are held in the storage capacitors C1 and C4.

At the same time, the control pulses pCr1 and pCr2 to be output to the initialization control line are changed to have a Low level to turn off the initialization switches Sw2, Sw3, Sw5, and Sw6. Thus, the initialization of the input electric potentials of the comparators Comp1 and Comp2 stops. At this time, the coupling capacitors C2 and C5 should hold the potential difference corresponding to the difference between the initialization voltage Vrf and the N signal Vn1.

The coupling capacitors C3 and C6 should hold the potential difference corresponding to the difference between the initialization voltage Vrf and the voltage of the odd-numbered column ramp wave signal line before a ramp wave occurs. The period from the time t02 to the time t04 is the storage operation period Tn1 for the N signal Vn1 of the pixel P11.

At and after the time t04, AD conversion is performed on the N signal Vn1. First, under control of the TG 211, the ramp waves Vrmp1 and Vrmp2 having an identical waveform are output from the odd-numbered column ramp wave generating unit 205 to the odd-numbered column ramp wave signal line.

Here, the coupling capacitors C3 and C6 hold the potential difference corresponding to the difference between the initialization voltage Vrf and the voltage of the odd-numbered column ramp wave signal line before the ramp waves occur. Thus, as an amount of change with respect to the initialization voltage Vrf, the ramp waveform is only input to the comparators Comp1 and Comp2 through the coupling capacitors C3 and C6. They are then compared with the inputs of the comparators Comp1 and Comp2 corresponding to the N signals Vn1 which have been already input thereto.

At that time, because the inputs of the comparators Comp1 and Comp2 corresponding to the N signal Vn1 are initialized to the initialization voltage Vrf, a signal corresponding to a difference should not be present ideally. However, in reality, a sum of the initialization voltage Vrf and the noise component n occurs due to a fluctuation caused by switching noise of the selection switches Sw1 and Sw4 and a variation of the comparators Comp1 and Comp2 is digitized as an N signal.

Because it can be assumed that the fluctuations due to switching noise of the initialization switches Sw2, Sw3, Sw5, and Sw6 occur equally in the two inputs to the comparators Comp1 and Comp2, such fluctuations are cancelled in the comparison. Thus, they may not be considered here.

Simultaneously with the output of the ramp waves Vrmp1 and Vrmp2, under control of the TG 211 through the control pulse pCNT output to the counter control line, the counter circuits 511 and 521 are set to down count, and a counting operation starts. At a time t05, the output of the ramp waves Vrmp1 and Vrmp2 ends.

The amplitudes of the ramp waves Vrmp1 and Vrmp2 may only be required to be enough for the amplitude of the noise component n. Therefore, a possible maximum value of the noise component n may be measured in advance and may be set such that the odd-numbered column ramp wave generating unit 205 can generate ramp waves having the corresponding amplitude.

At some point between the times t04 and t05, the signal levels of the input N signals Vn1 to the comparators Comp1 and Comp2 corresponding to the ramp waves Vrmp1 and Vrmp2 are matched. However, due to variations of the comparators Comp1 and Comp2, they may be matched at different times.

When the signal level of the ramp waves Vrmp1 and Vrmp2 the signal level of the N signal Vn1 are matched, comparison result signals are output from the comparators Comp1 and Comp2 to the corresponding counter circuits 511 and 521. The counter circuits 511 and 521 having received the comparison result signal stop their counter operations in response thereto and hold the current count values by keeping the states of the counters.

The period from the time t04 to the time t05 is an AD conversion period TAn1 for the N signals Vn1 of the pixel P11. This period is also a storage period in which the N signals Vn1 are required to be held in the storage capacitors C1 and C4.

Next, at a time t06, the control pulse pT1 to be output to the transfer control line is changed to have a High level to turn on the transfer transistor T1. Thus, the electric charge accumulated in the photoelectric conversion element D1 is transferred to the FD node 301. The electric charge is output as a signal of the photoelectric conversion element D1 to the odd-numbered column signal line 231.

At the same time, the control pulses pS1 and pS2 to be output to the signal selection control lines are changed to have a High level to turn on the selection switches Sw1 and Sw4. Thus, the signals of the photoelectric conversion element D1 output to the odd-numbered column signal line 231 can be transmitted to the storage capacitors C1 and C4.

Next, at a time t07, the control pulse pT1 to be output to the transfer control line is changed to have a Low level. Then, the processing waits until the signal level of the N+S signal Vns1 of the pixel P11 output to the odd-numbered column signal line 231 becomes stable. At a time t08 when the signal level of the N+S signal Vns1 becomes stable, the control pulses pS1 and pS2 to be output to the signal selection control lines are changed to have a Low level to turn off the selection switches Sw1 and Sw4. Thus, the N+S signals Vns1 are held in the storage capacitors C1 and C4.

The period from the time t06 to the time t08 is the storage operation period Ts1 for the N+S signals Vns1. At the same time, the N+S signals Vns1 are input to the corresponding comparators Comp1 and Comp2 through the coupling capacitors C2 and C5, but the coupling capacitors C2 and C5 hold a potential difference corresponding to the difference between the initialization voltage Vrf and the N signal Vn1. Thus, the S signal Vs1 being the difference between the N+S signal Vns1 and the N signal Vn1 is input as a signal corresponding to the electric charge of the photoelectric conversion element D1. Thus, a correlated double sampling is implemented which uses the coupling capacitors C2 and C5 for a clamp operation.

In the pixel signal reading operation performed on the first row, at a time t09, the control pulse pR1 to be output to the reset control line is changed to have a High level. Thus, the electric potential of the FD node 301 and the signal Vsig of the odd-numbered column signal line 231 are reset.

At a time t10 when the electric potential of the FD node 301 is sufficiently reset, the control pulse pR1 to be output to the reset control line and the control pulse pSEL1 to be output to the vertical selection line are changed to have a Low level. Thus, pixels of the first row including the pixel P11 is electrically isolated from the odd-numbered column signal line 231.

In a column signal processing operation performed on the first row, at and after the time t08, AD conversion is executed on the S signals Vs1 input to the comparators Comp1 and Comp2. First of all, under control of the TG 211, the ramp waves Vrmp1 and Vrmp2 having an identical waveform are output from the odd-numbered column ramp wave generating unit 205 to the odd-numbered column ramp wave signal line. The ramp waves generated here have the same slope as that of the N signal Vn1 upon AD conversion. However, the ramp waves may be required to have a sufficient amplitude for the amplitude corresponding to the S signal Vs1. Accordingly, a possible maximum value of the S signal may be measured in advance, and the amplitude of the ramp wave may be set such that the odd-numbered column ramp wave generating unit 205 can generate a ramp wave having the corresponding amplitude.

Like the AD conversion of the N signal Vn1, as an amount of change with respect to the initialization voltage Vrf, the ramp waveform is only input to the comparators Comp1 and Comp2 through the coupling capacitors C3 and C6. Here, a noise component due to fluctuations caused by switching noise of the selection switches Sw1 and Sw4 and variations of the comparators Comp1 and Comp2 are also added to the S signals Vs1 to be input to the comparators Comp1 and Comp2 through the coupling capacitors C2 and C5.

Simultaneously with the output of the ramp waves Vrmp1 and Vrmp2, under control of the TG 211 through the control pulse pCNT output to the counter control line, the counter circuits 511 and 521 are set to up count. Then, a counting operation starts from the count value when the AD conversion performed on the N signals Vn1 has stopped. At a time t17, the output of the ramp waves Vrmp1 and Vrmp2 ends.

At some point between the times t08 and t17, the signal level of the ramp waves Vrmp1, Vrmp2 and the signal level of the input S signals Vs1 to the corresponding comparators Comp1 and Comp2 are matched. However, due to variations of the comparators Comp1 and Comp2, they may be matched at different times.

When the signal levels of the ramp waves Vrmp1 and Vrmp2 and the input S signals Vs1 to the corresponding comparators Comp1 and Comp2 are matched, comparison result signals are output from the comparators Comp1 and Comp2 to the corresponding counter circuits 511 and 521. The counter circuits 511 and 521 having received the comparison result signals output the current count values and the latch signals to the corresponding latch circuits 512 and 522.

Here, the counter circuits 511 and 521 start from the count values of the N signals Vn1 of the comparators Comp1 and Comp2 having been set to down-count in advance. Because the S signals Vs1 containing the noise component n of the comparators Comp1 and Comp2 have been up-counted, the S signals Vs1 in which the noise component n has been cancelled are only counted. The latch circuits 512 and 522 having received the latch signals temporarily hold the current count values.

In response to the completion of the output of the ramp waves Vrmp1 and Vrmp2 at the time t17, the count values held by the latch circuits 512 and 522 are transferred to the computing circuit 513 as digital S signals Ds1 of the pixel P11. This operation is controlled by the TG 211 through the control pulse pLTC to be output to the latch control line and the control pulse pCAL to be output to the computing control line.

The period from the time t08 to the time t17 is the AD conversion period TAs1 for the S signals Vs1. This period is also a storage period in which the N+S signals Vns1 are required to be held in the storage capacitor C1.

In the noise reduction operation, the computing circuit 513 performs a predetermined computing, which will be described below, on the digital S signals of the pixel transferred from the latch circuits 512 and 522, and the computing results are stored.

The column signal processing operation performed on the first row has been described in which signals of pixels of the first row including the pixel P11 are read to the corresponding odd-numbered column signal processing units 203 and undergo AD conversion and the computing process in the computing circuit 513, and the computing result is then stored as a digital signal.

Next, the period from the time t18 to the time t22 is a horizontal output operation period for the first row in which the digital S signals of pixels of the first row stored in the computing circuit 513 after the computing are output.

In the period from the time t18 to the time t22, the TG 211 controls the odd-numbered column horizontal scanning unit 207 through the control line 285 so as to generate a control pulse pH1 for selecting the odd-numbered column signal processing units 203 in a predetermined order through the odd-numbered column selection line 251. Then, the digital S signals DSig1 of the pixels of the first row stored in the computing circuit 513 after the computing for the selected odd-numbered column signal processing unit 203 are output to the odd-numbered column output line 261. At that time, in the noise reduction operation, the control pulse pH2 is stopped in order to output the digital S signals only of the pixels of the first row after the computing.

After the output of pixel signals of the first row completes, the read operation is started to be performed on the second row in response to the horizontal synchronization signal at a time t22. Because this is the same operation as the one performed on the first row, it is not illustrated in FIG. 7. The operation having described up to this point is performed on every one row from the starting row in synchronization with the horizontal synchronization signal where a delay is given for each row, and pixel signals of the rows are sequentially output.

Therefore, the exposure periods of the rows are shifted in time row by row. Then, by repeating the operation in one horizontal synchronization period in the period from the time t01 to the time t22 for every row, signals of every row of pixels of the pixel array 201 can be read out.

FIG. 8 illustrates serial operations in the noise reduction operation to be performed in the image pickup device 12 according to this exemplary embodiment. FIG. 8 illustrates a noise reduction operation by using the same references and the same time points as those in FIG. 6. In the noise reduction operation, the two-channel analog-digital conversion processing is executed simultaneously on signals of pixels of the first row, as illustrated in FIG. 7.

In other words, both of the operations Opr1 and Opr2 read signals of the pixels of the first row to the odd-numbered column signal line 231 in the period from the time s01 to the time s04. In the period from the time s04 to the time s07, signals of pixels of the first row undergo analog-digital conversion in the odd-numbered column signal processing unit 203. At the time s07, a predetermined computing, which will be described below, is performed in the computing circuit 513 on the signals of pixels of the first row having undergone the simultaneous two-channel analog-digital conversion processing.

The period from the time s07 to the time s09 is a horizontal output operation period Dout1 in which the operation Opr1 outputs digital signals of the pixels of the first row after the computing, as illustrated in FIG. 7. Then, when the horizontal synchronization signals HD are output at the times s01, s09, and s13, the operations Opr1 and Opr2 perform the two-channel analog-digital conversion processing row by row at the same time in synchronization with the horizontal synchronization signals HD. Then, the operation Opr1 can read out signals from the pixels of the first row, the second row, and the third row. It is understood from this that the noise reduction operation which reads out signals from pixels of every row in the pixel array 201 can be continuously performed.

FIGS. 9A to 9C illustrates the computing processing in the noise reduction operation according to this exemplary embodiment. FIGS. 9A to 9C illustrate the computing processing to be performed on the pixel P11, for example, the computing processing on other pixels can be performed in the same manner.

Binary digital S signals ADo1 and ADo2 in FIG. 9A are input from the latch circuits 512 and 522, respectively, to the computing circuit 513 at the time t17 in FIG. 7 or at the time s07 in FIG. 8. It is understood from FIGS. 9A to 9C, signals differ in the lower three bits where LSB indicates the bit at the lowest digit and MSB indicates the bit at the highest bit. In this case, the binary ADo1 is 731 in decimal numbers, and binary ADo2 is 733 in decimal numbers.

This is because a noise component due to analog-digital conversion performed on the signal of the pixel P11 by using the different comparators Comp1 and Comp2 is contained in the digital S signal, as illustrated in FIG. 7. A computing process for reducing such noise is executed in the computing circuit 513. According to this exemplary embodiment, noise can be reduced by averaging.

First of all, ADo1 and ADo2 are added. FIG. 9B illustrates a result Add of the addition of the binary numbers ADo1 and ADo2, and Add is 1464 in decimal numbers. Next, Add is divided by 2 for averaging, which can be implemented by shifting the value by 1 bit because Add is represented in binary numbers. FIG. 9C illustrates an average result Ave. The noise component is averaged for noise reduction. Then, it is output as a digital S signal Dout1 in a period from the time s07 to the time s09 in the operation Opr1 in FIG. 8. In this case, the digital S signal Dout1 exhibits 732 in decimal numbers.

Having described that according to this exemplary embodiment, variations of the comparators as noise occurring in the column circuit, variations of the comparators may cause noise in ramp waves. Ramp waves Vrmp1 and Vrmp2 output as ramp waves having an identical shape from the odd-numbered column ramp wave generating unit 205 are influenced by fluctuations in phase and amplitude and noise before they are input to the comparators Comp1 and Comp2. In combination with the fluctuations and noise of the ramp waves Vrmp1 and Vrmp2 and variations of the comparators Comp1 and Comp2, the comparison results are matched at different times.

This may be noise occurring in the column circuit in the analog-digital conversion processing, but the noise can be reduced by executing the predetermined computing process according to this exemplary embodiment.

Up to this point, the readout of signals from odd-numbered column pixels and the operations of the odd-numbered column signal processing unit 203, odd-numbered column ramp wave generating unit 205 and odd-numbered column horizontal scanning unit 207 have been described according to this exemplary embodiment. However, it is apparent that the readout of signals from even-numbered column pixels and the operations of the even-numbered column signal processing unit 204, even-numbered column ramp wave generating unit 206 and even-numbered column horizontal scanning unit 208 can be described by using operating timing illustrated in FIGS. 5 to 8.

Thus, signals of odd-numbered column pixels and signals of even-numbered column pixels can be output in parallel from the odd-numbered column output unit 209 and the even-numbered column output unit 210. Therefore, the frame rates in the overlap-reading operation and noise reduction operation can be improved.

As described above, according to this exemplary embodiment, in the overlap-reading operation, two-channel analog-digital conversion units provided for each column signal line are used to perform an operation for reading signals of pixels of an odd-numbered row and an operation for reading signals of pixels of an even-numbered row in parallel for improvement of the frame rate.

In a noise reduction operation, two-channel analog-digital conversion units provided for each column signal line are used to perform analog-digital conversion simultaneously and then averaging on signals of one pixel for noise reduction.

The imaging by performing the overlap-reading operation and the imaging by performing the noise reduction operation may be switched as required so that an increase of the time of the photographing operation can be avoided.

The type of imaging may be switched in accordance with a selection directly input by a user through the operating unit 16. The type of imaging may be selected by the synchronization control unit 15 in accordance with the signal processing such as white balance adjustment, color correction, gamma correction, AF (Auto Focus), and AE (Auto Exposure) performed by the signal processing unit 13.

Furthermore, signals of odd-numbered column pixels and signals of even-numbered column pixels can be output in parallel from different output units so that the frame rates can further be improved in both of the overlap-reading operation and the noise reduction operation.

Figure 10:
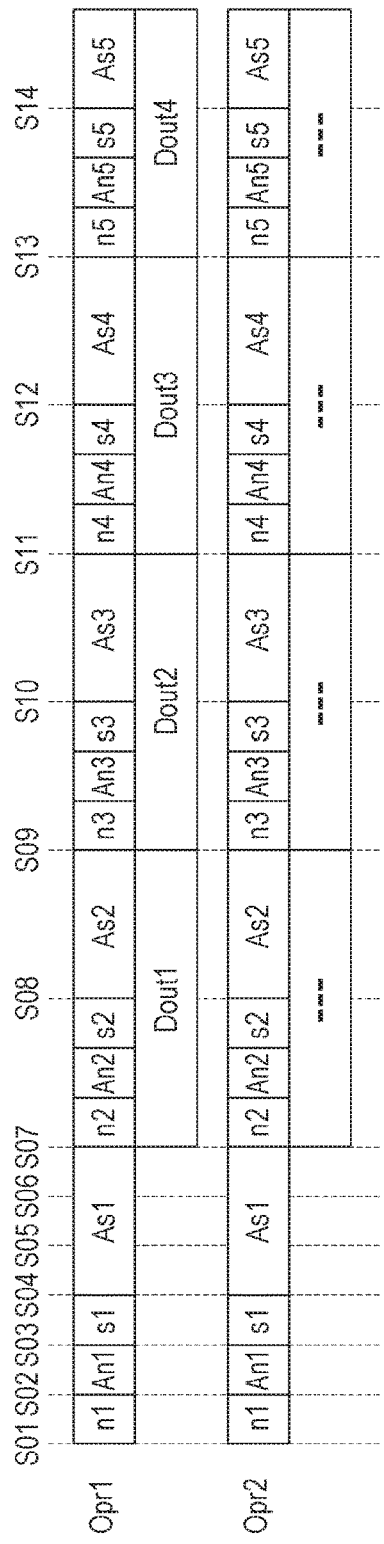
FIG. 10 illustrates a noise reduction operation according to a variation example of the first exemplary embodiment.

Next, a variation example of this embodiment will be described with reference to FIG. 10. FIG. 10 illustrates a variation example of the noise reduction operation by using the same references and the same time points as those in FIG. 8.

In the period from the time s01 to the time s07, an operation for reading signals from pixels of the first row and a column signal processing operation are performed, like FIG. 8. At the time s07, digital S signals of the pixels transferred from the latch circuits 512 and 522 are averaged and stored by the computing circuit 513.

At that time, because the comparators Comp1 and Comp2, the counter circuits 511 and 521, and the latch circuits 512 and 522 are released from the column signal processing operation of the first row, an operation for reading signals from pixels of the second row and the column signal processing operation thereon can be started. Thus, in the period from the time s07 to the time s09, the horizontal output operation Dout1 of the first row and the pixel signal reading operation of the second row and the column signal processing operation are performed simultaneously. At the time s09, before the digital S signals of pixels of the second row are transferred from the latch circuits 512 and 522 to the computing circuit 513, the timing of the TG 211 is controlled so as to stop the horizontal output operation Dout1 of the first row.

When the horizontal synchronization signals HD are output at times s01, s07, s09, s11, and s13, the operations Opr1 and Opr2 perform the two-channel analog-digital conversion processing row by row at the same time in synchronization with the horizontal synchronization signal HD. Then, the operation Opr1 can read out signals from the pixels of the first row, the second row, the third row, the fourth row, and the fifth row. Thus, the variation example of the noise reduction operation which reads out signals from pixels of every row in the pixel array 201 can be continuously performed. Furthermore, the pixel signal reading operation and the column signal processing operation can be performed simultaneously with the horizontal output operation of the previous row to achieve a doubling of the frame rate.

As described above, according to the variation example of this embodiment, the variation example of the noise reduction operation includes the pixel reading operation and the horizontal output operation of the previous row which at least partially overlap each other by using the column signal processing unit provided for each column signal line. Thus, the improved frame rate can be achieved, and noise reduction can also be achieved by performing analog-digital conversion on signals of one pixel at the same time and then averaging the resulting signals by using the two-channel analog-digital conversion units. This can realize noise reduction and a frame rate as high as that of the overlap-reading operation.

Second Exemplary Embodiment

Next, with reference to FIG. 11 to FIGS. 14A to 14C in addition to FIG. 1 to FIG. 3, a second exemplary embodiment will be described. Because the fundamental configuration and operations of an imaging apparatus and the fundamental configuration and operations of an image pickup device according to this exemplary embodiment are the same as those of the first exemplary embodiment, this exemplary embodiment will be described by using the same drawings and references.

According to the first exemplary embodiment, two-channel analog-digital conversion units provided for each column signal line are used to perform analog-digital conversion on signals of one pixel simultaneously, and the resulting signals are averaged for noise reduction. According to this exemplary embodiment, four-channel analog-digital conversion units provided for each column signal line are used to perform an overlap-reading operation and a noise reduction operation.

Figure 11:
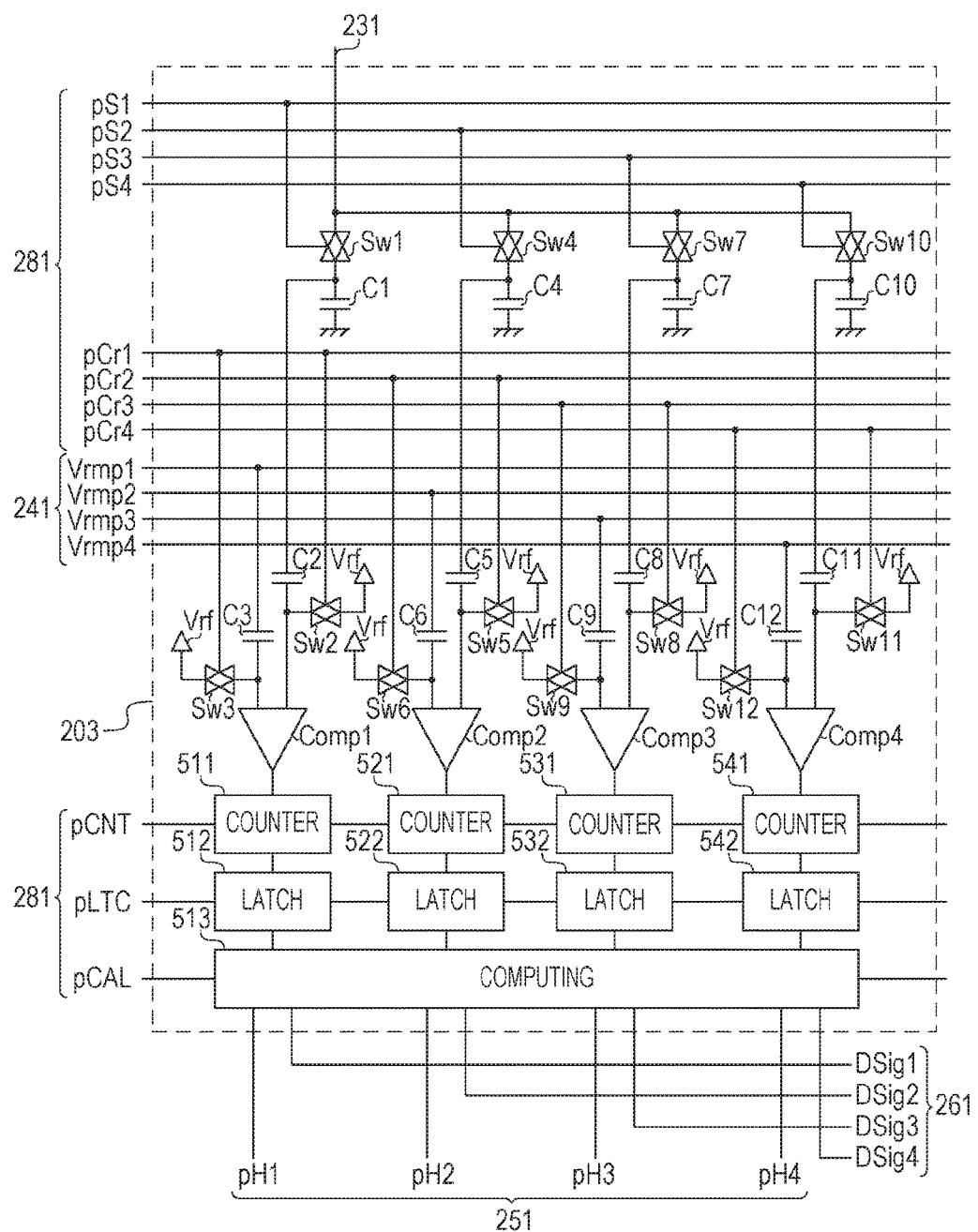
FIG. 11 illustrates a circuit configuration of a column signal processing unit according to a second exemplary embodiment.

FIG. 11 illustrates a circuit configuration of the odd-numbered column signal processing unit 203 in the image pickup device 12 according to this exemplary embodiment. According to this exemplary embodiment, the odd-numbered column signal processing unit 203 corresponding to odd-numbered column pixels will be described, for example. Because the even-numbered column signal processing unit 204 corresponding to even-numbered column pixels is the same as odd-numbered column signal processing unit 203, the repetitive description will be omitted.

FIG. 11 illustrates a circuit including storage capacitors, coupling capacitors, switches, comparators, counter circuits, latch circuits, and a computing circuit, like the one illustrated in FIG. 4. Because the circuits in FIG. 4 and FIG. 11 are the same except that FIG. 11 illustrates a four-channel circuit configuration while FIG. 4 illustrates a two-channel circuit configuration, detail description will be omitted.

The control lines 281 from the TG 211 further include initialization control lines for outputting control pulses pCr3 and pCr4 and signal selection control lines for outputting control pulses pS3 and pS4 corresponding to selection switches Sw7 and Sw10. The odd-numbered column reference signal lines 241 from the odd-numbered column ramp wave generating unit 205 further include odd-numbered column ramp wave signal lines for outputting ramp waves Vrmp3 and Vrmp4.

The odd-numbered column selection lines 251 from the odd-numbered column horizontal scanning unit 207 further include memory selection lines fir outputting control pulses pH3 and pH4. The odd-numbered column output lines 261 connected to the odd-numbered column output unit 209 further include digital output lines for outputting digital signals DSig3 and DSig4.

According to this exemplary embodiment, the switches Sw1 to Sw12 are brought into conduction (ON) when a control pulse output to the connected control line has a High level and is cut off (OFF) when it has a Low level.

Figure 12:
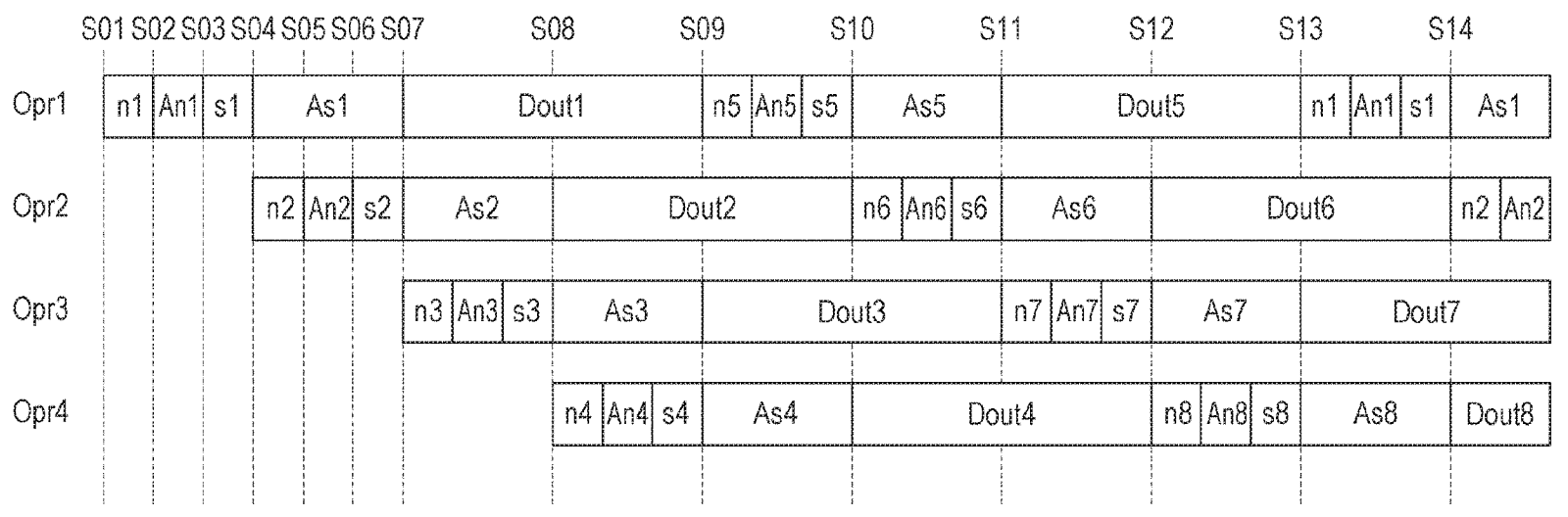

FIG. 12 illustrates serial operations of an overlap-reading operation to be performed by the image pickup device 12 according to this exemplary embodiment. In this exemplary embodiment, analog-digital conversion processing is performed on the pixels 200 provided in the pixel array 201 by using a four-channel circuit configuration provided for every four serial rows.

An operation Opr1 includes readout from pixels to output of digital pixel signals DSig1 through the corresponding digital output line where signals are read out from every other fifth row starting from the first row. An operation Opr2 includes readout from pixels to output of digital pixel signals DSig1 through the corresponding digital output line where signals are read out from every other fifth row starting from the second row. In an operation Opr3, signals are read out from every other fifth row starting from the third row. In an operation Opr4, signals are read out from every other fifth row starting from the fourth row.

It is assumed that pixels of a row k are to be read out in the pixel array 201 as in FIG. 6. The storage operation period Tnk and AD conversion period TAnk of N signals Vnk of the kth row, the storage operation period Tsk and AD conversion period TAsk of S signals Vsk of the kth row, and a horizontal output operation period are schematically indicated as nk, Ank, sk, Ask, and Doutk, respectively.

Referring to FIG. 12, the period from a time s01 to a time s04 of the operation Opr1 corresponds to an operation period in which signals of pixels of the first row are read to the odd-numbered column signal line 231, and the period from the time s04 to a time s07 of the operation Opr2 corresponds to an operation period in which signals of pixels of the second row are read to the odd-numbered column signal line 231. Also, the period from the time s07 to a time s08 of the operation Opr3 and the period from the time s08 to a time s09 of the operation Opr4 correspond to operation periods in which signals of pixels of the third and fourth rows, respectively, are read to the odd-numbered column signal line 231.

FIG. 11 illustrates pixel reading operation periods in which the common odd-numbered column signal line 231 is used in time-division manner so that the signals of pixels of the first, second, third and fourth rows can be transferred to the corresponding storage capacitors C1 and C4, C7, and C10, respectively.

The period from the time s04 to the time s07 of the operation Opr1, the period from the time s07 to the time s08 of the operation Opr2, the period from the time s08 to the time s09 of the operation Opr3, and the period from the time s09 to the time s10 of the operation Opr4 are AD conversion periods in which signals of pixels of the first to fourth rows are AD converted. The resulting signals are held in the corresponding latch circuits 512, 522, 532, and 542.

At the times s07, s08, s09, and s10 of the operations Opr1 to Opr4 at the ends of the AD conversion periods, the digital signals of the pixels of the first to fourth rows are transferred from the respective latch circuits 512, 522, 532, and 542 to the computing circuit 513.

In the period from the time s07 to the time s09, the period from the time s08 to the time s10, the period from the time s09 to the time s11, the period from the time s10 to the time s12 of the operations Opr1 to Opr4, digital signals DSig1 to DSig4 of the pixels of the first to fourth rows are output from the computing circuit 513 to the corresponding digital output lines. The outputs are controlled by the control pulses pH1 to pH4 output to the corresponding horizontal selection lines.

When the horizontal synchronization signals HD are output at the times s01, s09, and s13, signals are read out from pixels of every fifth row starting from the first row in synchronization with the horizontal synchronization signal HD in the operation Opr1. In the operation Opr2, at the times s04, s10, and s14 which are time points corresponding to time differences between operation periods for reading to the odd-numbered column signal line 231, signals are read out from pixels of every other fifth row starting from the second row.

Also in the operation Opr3, at the times s07 and s11 which are time points corresponding to a time difference between the operation periods for reading, signals are read out from pixels of every other fifth row starting from the third row. Also in the operation Opr4, at the times s08 and s12 which are time points corresponding to a time difference between the operation periods for reading, signals are read out from pixels of every other fifth row starting from the fourth row. It may be understood from this that the overlap-reading operation which reads out signals of pixels of every four rows in the pixel array 201 can be serially performed.

Because signals can be read out from pixels of four rows in parallel, a doubling of the frame rate of the first exemplary embodiment can be achieved.

FIG. 13 illustrates serial operations of a noise reduction operation to be performed by the image pickup device 12 according to this exemplary embodiment. FIG. 13 illustrates the noise reduction operation by using the same references and the same time points as those in FIG. 12.

For the noise reduction operation, a circuit configuration supporting four-channel analog-digital conversion processing to be performed on signals of pixels of the first row simultaneously, as described with reference to FIG. 11. In other words, the operations Opr1, Opr2, Opr3, and Opr4 read signals of the pixels of the first row to the odd-numbered column signal line 231 in the period from the time s01 to the time s04. In the period from the time s04 to the time s07, signals of pixels of the first row undergo analog-digital conversion in the odd-numbered column signal processing unit 203.

At a time s07, a predetermined computing, which will be described below, is performed in the computing circuit 513 on the signals of pixels of the first row having undergone the simultaneous four-channel analog-digital conversion processing. The period from the time s07 to the time s09 is a horizontal output operation period Dout1 in which only the operation Opr1 outputs the digital signals DSig1 of the pixels of the first row after computing to the corresponding digital output line in response to the control pulse pH1 from the horizontal selection line.

At that time, the control pulses pH2, pH3, and pH4 from the horizontal selection lines are stopped to inhibit output of signals by the operations Opr2, Opr3, and Opr4. The horizontal synchronization signals HD are output at the times s01, s09, s13. Thus, the operations Opr1, Opr2, Opr3, and Opr4 can perform four-channel analog-digital conversion processing row by row simultaneously with the horizontal synchronization signals HD, and the operation Opr1 can read out signals from the pixels of the first, second, and third row. It is understood from this that the noise reduction operation which reads out signals from pixels of every row in the pixel array 201 can be continuously performed.

FIGS. 14A to 14C illustrate the computing processing in the noise reduction operation according to this exemplary embodiment. FIGS. 14A to 14C illustrate the computing processing to be performed on the pixel P11, for example, but the computing processing on other pixels can be performed in the same manner.

Binary digital S signals ADo1, ADo2, ADo3, and ADo4 in FIG. 14A are input from the respective latch circuits 512 and 522, 532, and 542 to the computing circuit 513 at the time s07 in FIG. 13. It is understood from FIGS. 14A to 14C, signals differ in the lower three bits where LSB indicates the bit at the lowest digit and MSB indicates the bit at the highest bit.

In this case, the binary ADo1, ADo2, ADo3, and ADo4 are 731, 735, 730, and 732, respectively, in decimal numbers. This is because a noise component due to analog-digital conversion performed on the signal of the pixel P11 by using the different comparators Comp1, Comp2, Comp3 and Comp4 is contained in the digital S signals, as illustrated in FIG. 11.

A computing process for reducing such noise is executed in the computing circuit 513. According to this exemplary embodiment, noise can be reduced by averaging.

First of all, ADo1, ADo2, ADo3, and ADo4 are added. FIG. 14B illustrates a result Add of the addition of the binary numbers ADo1, ADo2, ADo3, and ADo4, and Add is 2928 in decimal numbers.

Next, Add is divided by 4 for averaging, which can be implemented by shifting the value by 2 bits toward the lowest digit because Add is represented in binary number. FIG. 14C illustrates an average result Ave. The noise component is averaged for noise reduction. Then, it is output as a digital S signal Dout1 in a period from the time s07 to the time s09 in the operation Opr1 in FIG. 13. In this case, the digital S signal Dout1 exhibits 732 in decimal numbers.

Having described that according to this exemplary embodiment, variations of the comparators as noise occurring in the column circuit, variations of the comparators may cause noise in ramp waves. Ramp waves output as ramp waves having an identical shape from the odd-numbered column ramp wave generating unit are influenced by fluctuations in phase and amplitude and noise before they are input to the comparators. In combination with the fluctuations and noise of the ramp waves and variations of the comparators, the comparison results are matched at different times.

This may be noise occurring in the column circuit in the analog-digital conversion processing, but the noise can be reduced by executing the predetermined computing process according to this exemplary embodiment. Up to this point, the readout of signals from odd-numbered column pixels and the operations of the odd-numbered column signal processing unit 203, odd-numbered column ramp wave generating unit 205 and odd-numbered column horizontal scanning unit 207 have been described according to this exemplary embodiment. However, it is apparent that the readout of signals from even-numbered column pixels and the operations of the even-numbered column signal processing unit 204, even-numbered column ramp wave generating unit 206 and even-numbered column horizontal scanning unit 208 can be described by using operating timing illustrated in FIGS. 12 and 13.

Thus, signals of odd-numbered column pixels and signals of even-numbered column pixels can be output in parallel from the odd-numbered column output unit 209 and the even-numbered column output unit 210. Therefore, the frame rates in the overlap-reading operation and noise reduction operation can be improved.

As described above, according to this exemplary embodiment, in the overlap-reading operation, four-channel analog-digital conversion units provided for each column signal line are used to perform an operation for reading signals of pixels of four rows in parallel for improvement of the frame rate.

In a noise reduction operation, the four-channel analog-digital conversion units provided for each column signal line are used to perform analog-digital conversion simultaneously and then averaging on signals of one pixel for noise reduction.

The imaging by performing the overlap-reading operation and the imaging by performing the noise reduction operation may be switched as required so that an increase of the time of the photographing operation can be avoided.

The type of imaging may be switched in accordance with a selection directly input by a user through the operating unit 16 or may be selected by the synchronization control unit 15 in accordance with the signal processing such as white balance adjustment, color correction, gamma correction, AF, and AE performed by the signal processing unit 13.

Furthermore, signals of odd-numbered column pixels and signals of even-numbered column pixels can be output in parallel from different output units so that the frame rates can further be improved in both of the overlap-reading operation and the noise reduction operation.

Third Exemplary Embodiment

Figure 17:
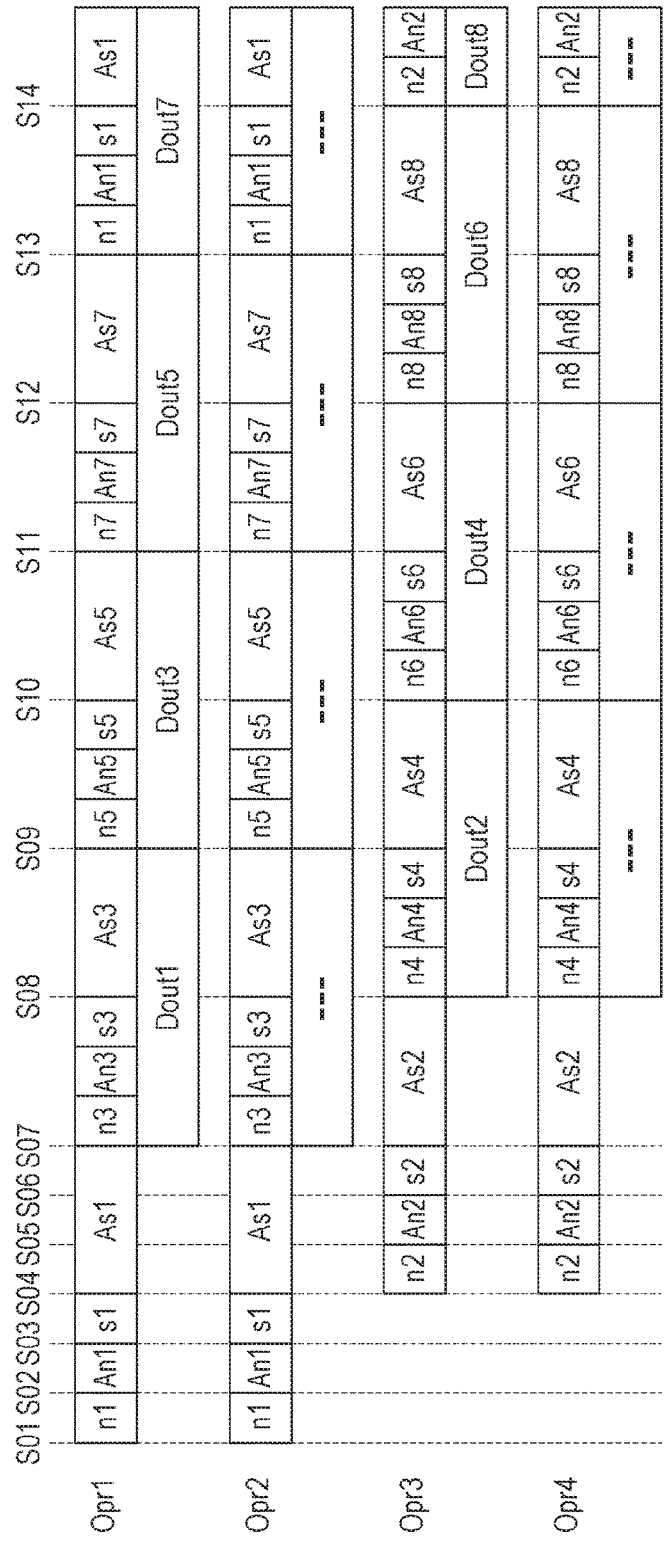
FIG. 17 illustrates a noise reduction operation according to a variation example of the third exemplary embodiment.

Next, with reference to FIGS. 15 to 17 in addition to FIGS. 1 to 3, FIGS. 9A to 9C, FIG. 11, and FIG. 12, a third exemplary embodiment will be described. Because the fundamental configuration and operations of an imaging apparatus and the fundamental configuration and operations of an image pickup device according to this exemplary embodiment are the same as those of the second exemplary embodiment, this exemplary embodiment will be described by using the same drawings and references.

According to the second exemplary embodiment, four-channel analog-digital conversion units provided for each column signal line are used to perform analog-digital conversion on signals of one pixel simultaneously, and the resulting signals are averaged for noise reduction. According to this exemplary embodiment, a noise reduction operation different from that of the second exemplary embodiment will be described which can achieve an improved frame rate and noise reduction by using four-channel analog-digital conversion units.

Figure 15:
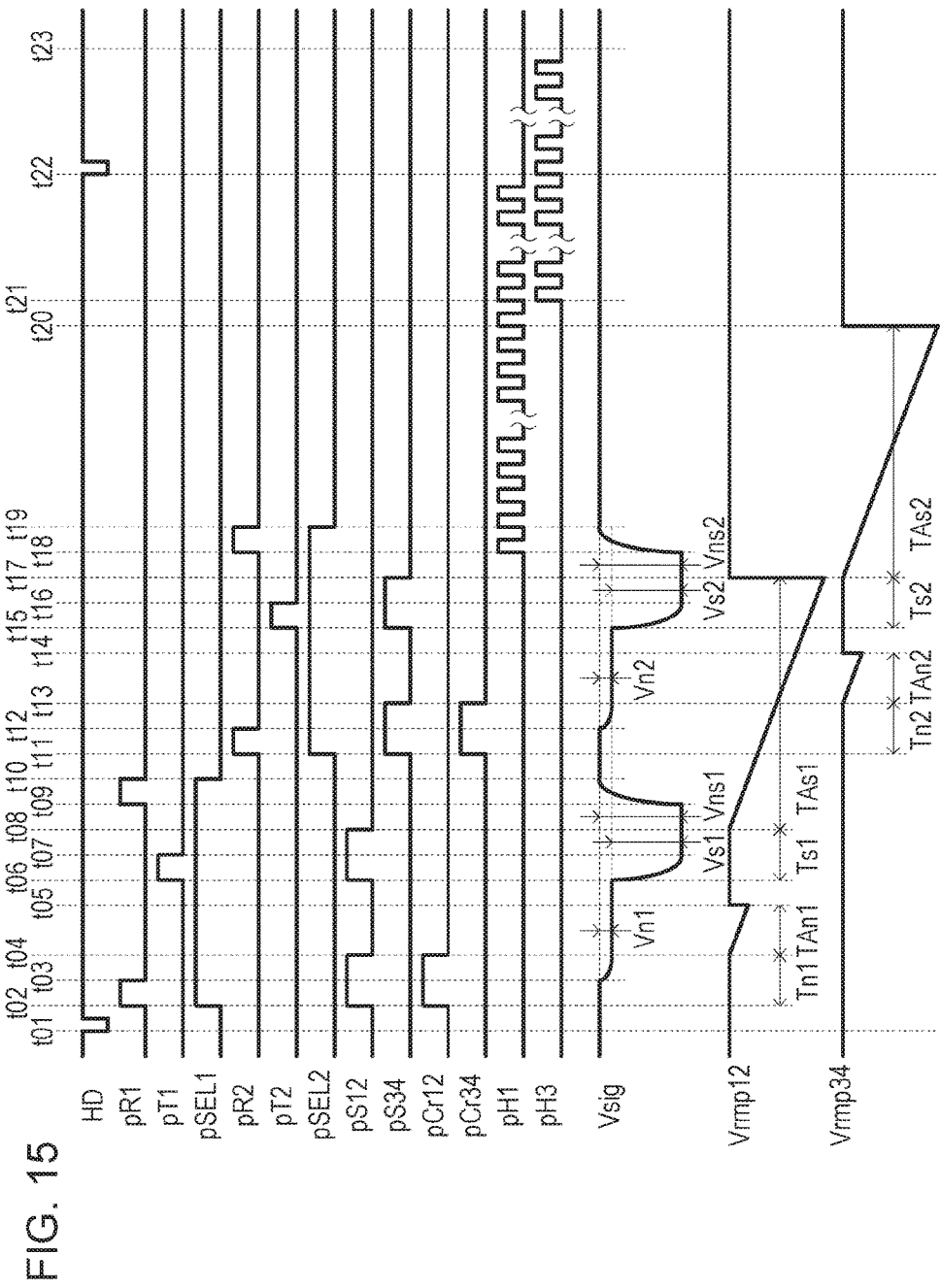
FIG. 15 illustrates noise reduction operation timing according to a third exemplary embodiment.

FIG. 15 illustrates timing of a noise reduction operation to be performed by the image pickup device 12 according to this exemplary embodiment. FIG. 15 illustrates the noise reduction operation by using the same references and the same time points as those in FIG. 5.

In a noise reduction operation, from a first pixel and a second pixel, an N signal resetting the FD node 301 and an S signal reading out an electric charge of the photoelectric conversion element D1 to the FD node 301 are read out. The common odd-numbered column signal line 231 is used to perform analog-digital conversion processing on the signal of the first pixel and the signal of the second pixel which are read with a time difference therebetween and output the digitized pixel signals.

It is assumed here that the first pixel is a pixel P11 of the first row, that the N signal and the S signal have amplitudes Vn1 and Vs1, respectively, and that the S signal containing the N signal has an amplitude Vns1. It is further assumed that the second pixel is a pixel P21 of the second row, that the N signal and the S signal have amplitudes Vn2 and Vs2, respectively, and that the S signal containing the N signal has an amplitude Vns2.

The odd-numbered column signal processing unit 203 is capable of performing four-channel analog-digital conversion processing. Two-channel analog-digital conversion processing is performed simultaneously on the signal of the pixel P11, and two-channel analog-digital conversion processing is performed simultaneously on the signal of the pixel P21 read with a time difference from the reading of the signal of the pixel P11. Reading out signals from pixels in the pixel array 201 by repeating the noise reduction operation where the first pixel is handled as a pixel of an odd-numbered row and the second pixel is handled as a pixel of an even-numbered row can implement one photographing operation.

At a time t01, after a lapse of a preset exposure period, a horizontal synchronization period for performing the noise reduction operation starts. Because the operation for reading signals from pixels of the first row including the pixel P11 in the period from the time t02 to the time t10 is the same as the one in FIG. 5, detail descriptions will be omitted.

First of all, at a time t02, a control pulse pR1 to be output to the reset control line and a control pulse pSEL1 to be output to the vertical selection line are changed to have a High level. Then, the electric potential of the FD node 301 is reset, and voltage corresponding to the reset electric potential is output to the odd-numbered column signal line 231.

At the same time, the control pulses pS1 and pS2 to be output to the signal selection control lines are changed to have a High level to turn on the selection switches Sw1 and Sw4. Thus, the signals output to the odd-numbered column signal lines 231 are transmitted to the storage capacitors C1 and C4.

In the noise reduction operation illustrated in FIG. 15, the control pulses pS1 and pS2, which are the same and will collectively be called control pulses pS12, are to be applied and output to the signal selection control lines. Further at the same time, the control pulses pCr1 and pCr2 to be output to the initialization control lines are changed to have a High level to turn on the initialization switches Sw2, Sw3, Sw5, and Sw6. Thus, the inputs of the comparators Comp1 and Comp2 are set to initialization voltage Vrf.

In the noise reduction operation illustrated in FIG. 15, the control pulses pCr1 and pCr2, which are the same and will collectively be called control pulses pCr12, are to be applied and output to the initialization control lines.

Next, at a time t03, a control pulse pR1 to be output to the reset control line is changed to have a Low level. At a time t04 when the signal level of the N signal Vn1 becomes stable, the control pulses pS1 and pS2 to be output to the signal selection control lines are changed to have a Low level to turn off the selection switches Sw1 and Sw4. Thus, the N signals Vn1 are held in the storage capacitors C1 and C4.

At the same time, the control pulses pCr1 and pCr2 to be output to the initialization control lines are changed to have a Low level to turn off the initialization switches Sw2, Sw3, Sw5, and Sw6. Thus, the initialization of the input electric potentials of the comparators Comp1 and Comp2 stops.

The period from the time t02 to the time t04 is the storage operation period Tn1 for the N signal Vn1 of the pixel P11. After the time t04, AD conversion is performed on the N signal Vn1.

First, under control of the TG 211, ramp waves having the same waveform are output from the odd-numbered column ramp wave generating unit 205 to the odd-numbered column ramp wave signal line. In the noise reduction operation illustrated in FIG. 15, ramp waves Vrmp12 having an identical waveform are output to the odd-numbered column ramp wave signal line. They are then compared with the inputs of the comparators Comp1 and Comp2 corresponding to the N signals Vn1 which have been already input thereto.

Simultaneously with the output of the ramp waves Vrmp12, under control of the TG 211 through the control pulse pCNT output to the counter control line, the counter circuits 511 and 521 are set to down-count, and a counting operation starts. At a time t05, the output of the ramp waves Vrmp12 ends.

At some point between the times t04 and t05, the signal level of the ramp waves Vrmp12 and the signal level of the N signals Vn1 are matched. However, due to variations of the comparators Comp1 and Comp2, they may be matched at different times.

When the ramp waves Vrmp12 and the signals Vn1 are matched, comparison result signals are output from the comparators Comp1 and Comp2 to the corresponding counter circuits 511 and 521. The counter circuits 511 and 521 having received the comparison result signals stop the counters in response thereto and hold the current count values by keeping the states of the counters. The period from the time t04 to the time t05 described above will be called an AD conversion period TAn1 of the N signal Vn1 for the pixel P11.

Next, at a time t06, the control pulse pT1 for the transfer control line is changed to have a High level to turn on the transfer transistor T1. Thus, the electric charge accumulated in the photoelectric conversion element D1 is transferred to the FD node 301 and is output as a signal of the photoelectric conversion element D1 to the odd-numbered column signal line 231.

At the same time, control pulses pS1 and pS2 to be output to the signal selection control lines are changed to have a High level to turn on the selection switches Sw1 and Sw4. Thus, the signals of the photoelectric conversion element D1 output to the odd-numbered column signal line 231 are transmitted to the storage capacitors C1 and C4.

Next, at a time t07, after the control pulse pT1 for the transfer control line is changed to have a Low level, the processing waits until the signal level of the N+S signal Vns1 of the pixel P11 output to the odd-numbered column signal line 231 becomes stable. At a time t08 when the signal level of the N+S signal Vns1 becomes stable, control pulses pS1 and pS2 for the signal selection control lines are changed to have a Low level to turn off the selection switches Sw1 and Sw4. Thus, the N+S signals Vns1 are held in the storage capacitors C1 and C4. The period from the time t06 to the time t08 described above will be called a storage operation period Ts1 of the N+S signal Vns1.

At the same time, the N+S signals Vns1 are input to the corresponding comparators Comp1 and Comp2 through the coupling capacitors C2 and C5, but the coupling capacitors C2 and C5 hold a potential difference corresponding to the difference between the initialization voltage Vrf and the N signal Vn1. Thus, the S signal Vs1 being the difference between the N+S signal Vns1 and the N signal Vn1 is input as a signal corresponding to the electric charge of the photoelectric conversion element D1. Thus, a correlated double sampling is implemented which uses the coupling capacitors C2 and C5 for a clamp operation.

In the pixel signal reading operation performed on the first row, at a time t09, the control pulse pR1 for the reset control line is changed to have a High level. Thus, the electric potential of the FD node 301 and the signal of the odd-numbered column signal line 231 are reset. At a time t10 when the electric potential of the FD node 301 is sufficiently reset, the control pulse pR1 for the reset control line and the control pulse pSEL1 for the vertical selection line are changed to have a Low level. Thus, pixels of the first row including the pixel P11 is electrically isolated from the odd-numbered column signal line 231.

In a column signal processing operation performed on the first row, after the time t08, AD conversion is executed on the S signals Vs1 input to the comparators Comp1 and Comp2.

First of all, under control of the TG 211, the ramp waves Vrmp12 having an identical waveform are output from the odd-numbered column ramp wave generating unit 205 to the odd-numbered column ramp wave signal line. They are then compared with the inputs of the comparators Comp1 and Comp2 corresponding to the S signals Vs1 which have been already input thereto.

Simultaneously with the output of the ramp waves Vrmp12, under control of the TG 211 through the control pulse pCNT for the counter control line, the counter circuits 511 and 521 are set to up-count. In response thereto, a counting operation starts from the count value when the AD conversion performed on the N signals Vn1 has stopped. At a time t17, the output of the ramp waves Vrmp12 ends.

At some point between the times t08 and t17, the signal level of the ramp waves Vrmp12 and the signal level of the S signals Vs1 are matched. However, due to variations of the comparators Comp1 and Comp2, they may be matched at different times. When the signal levels of the ramp waves Vrmp12 and the S signals Vs1 are matched, comparison result signals are output from the comparators Comp1 and Comp2 to the corresponding counter circuits 511 and 521. The counter circuits 511 and 521 having received the comparison result signals output the current count values and the latch signals to the corresponding latch circuits 512 and 522.

Here, the counter circuits 511 and 521 start from the count values of the N signals Vn1 (corresponding to the voltage level as a result of the addition of a noise component n to the initialization voltage Vrf) of the comparators Comp1 and Comp2 having been set to down-count in advance. Because the S signals Vs1 containing the noise component n have been up-counted, the S signals Vs1 in which the noise component n has been cancelled are only counted. The latch circuits 512 and 522 having received the latch signals temporarily hold the current count values.

In response to the completion of the output of the ramp waves Vrmp12 at the time t17, the count values held by the latch circuits 512 and 522 are transferred to the computing circuit 513 as digital S signals Ds1 of the pixel P11. This operation is controlled by the TG 211 through the control pulse pLTC for the latch control line and the control pulse pCAL for the computing control line.

The period from the time t08 to the time t17 is the AD conversion period TAs1 for the S signals Vs1. This period is also a storage period in which the N+S signals Vns1 are required to be held in the storage capacitors C1 and C4.

In the computing circuit 513, the averaging as illustrated in FIGS. 9A to 9C is performed on the digital S signals of the pixel transferred from the latch circuits 512 and 522, and the digital S signal having reduced noise of the pixel is stored.

The column signal processing operation performed on the first row has been described in which signals of pixels of the first row including the pixel P11 are read to the corresponding odd-numbered column signal processing units 203 and undergo the analog-digital conversion processing and the computing process in computing circuit 513, and the computing result is stored as a digital signal.

Next, the period from the time t18 to the time t22 is a horizontal output operation period for the first row in which the digital S signals of pixels of the first row stored in the computing circuit 513 after the computing are output. In the period from the time t18 to the time t22, the TG 211 controls the odd-numbered column horizontal scanning unit 207 through the control line 285 so as to generate a control pulse pH1 for selecting the odd-numbered column signal processing units 203 in a predetermined order through horizontal selection lines being the odd-numbered column selection line 251 correspondingly connected thereto.

Then, the digital S signals DSig1 of the pixels of the first row stored in the computing circuit 513 after the computing for the selected odd-numbered column signal processing unit 203 are output to a digital output line being the odd-numbered column output line 261. At that time, in the noise reduction operation, the control pulse pH2 for the horizontal selection line is stopped in order to output the digital S signals only of the pixels of the first row after the computing.

In the noise reduction operation, at the time t11 while the S signals Vs1 are being AD converted, an operation for reading signals of the pixels of the second row including the pixel P21 starts. Because the operation for reading signals of pixels of the second row including the pixel P21 in the period from the time t11 to the time t19 is the same as the one illustrated in FIG. 5, detail description will be omitted.

First of all, at the time t11, the control pulse pR2 for the reset control line and the control pulse pSEL2 for the vertical selection line are changed to have a High level to reset the electric potential of the FD node 301. Thus, voltage corresponding to the reset electric potential is output to the odd-numbered column signal line 231.

At the same time, the control pulses pS3 and pS4 for the signal selection control line are changed to have a High level to turn on the selection switches Sw7 and Sw10. Thus, the signals output to the odd-numbered column signal line 231 are transmitted to the storage capacitors C7 and C10. In the noise reduction operation illustrated in FIG. 15, control pulses, which are the same and will collectively be called control pulses pS34, are applied to the signal selection control line.

Further at the same time, the control pulses pCr3 and pCr4 for the initialization control lines are changed to have a High level to turn on the initialization switches Sw8, Sw9, Sw11, Sw12. Thus, the inputs of the comparators Comp3 and Comp4 are set to the initialization voltage Vrf. In the noise reduction operation illustrated in FIG. 15, the control pulses pCr3 and pCr4 for the initialization control line, which are the same and will collectively be called pCr34, are applied.

Next, at a time t12, the control pulse pR2 for the reset control line is changed to have a Low level. At a time t13 when the signal levels of the N signals Vn2 become stable, the control pulse pS34 for the signal selection control line is changed to have a Low level to turn off the selection switched Sw7 and Sw10. Thus, the transmitted N signals Vn2 are held in the storage capacitors C7 and C10.

At the same time, the control pulses pCr34 for the initialization control line are changed to have a Low level to turn off the initialization switches Sw8, Sw9, Sw11, and Sw12. Thus, the initialization of the input electric potentials of the comparators Comp3 and Comp4 stops. The period from the time t11 to the time t13 is the storage operation period Tn2 for the N signal Vn2 of the pixel P21.

After the time t13, AD conversion is performed on the N signal Vn2. First, under control of the TG 211, ramp waves Vrmp3 and Vrmp4 having the same waveform are output from the odd-numbered column ramp wave generating unit 205 to the odd-numbered column ramp wave signal line. In the noise reduction operation illustrated in FIG. 15, ramp waves Vrmp3 and Vrmp4, which have the same waveform and will be called ramps waves Vrmp34 are output to the odd-numbered column ramp wave signal line. They are then compared with the inputs of the comparators Comp3 and Comp4 corresponding to the N signals Vn2 which have been already input thereto.

Simultaneously with the output of the ramp waves Vrmp34, under control of the TG 211 through the control pulse pCNT output to the counter control line, the counter circuits 531 and 541 are set to down-count, and a counting operation starts. At a time t14, the output of the ramp waves Vrmp34 ends.

At some point between the times t13 and t14, the signal level of the ramp waves Vrmp34 and the signal level of the N signals Vn2 input to the corresponding comparators Comp3 and Comp4 are matched. However, due to variations of the comparators Comp3 and Comp4, they may be matched at different times.

When the ramp waves Vrmp34 and the N signals Vn2 are matched, comparison result signals are output from the comparators Comp3 and Comp4 to the corresponding counter circuits 531 and 541. The counter circuits 531 and 541 having received the comparison result signals stop the counters in response thereto and hold the current count values by keeping the states of the counters. The period from the time t13 to the time t14 described above will be called an AD conversion period TAn2 of the N signal Vn2 for the pixel P21.

Next, at a time t15, the control pulse pT2 for the transfer control line is changed to have a High level to turn on the transfer transistor T1. Thus, the electric charge accumulated in the photoelectric conversion element D1 is transferred to the FD node 301 and is output as a signal of the photoelectric conversion element D1 to the odd-numbered column signal line 231. At the same time, control pulses pS34 to be output to the signal selection control lines are changed to have a High level to turn on the selection switches Sw7 and Sw10. Thus, the signals of the photoelectric conversion element D1 output to the odd-numbered column signal line 231 are transmitted to the storage capacitors C7 and C10.

Next, at a time t16, after the control pulse pT2 for the transfer control line is changed to have a Low level, the processing waits until the signal level of the N+S signal Vns2 of the pixel P21 output to the odd-numbered column signal line 231 becomes stable. At a time t17 when the signal level of the N+S signal Vns2 becomes stable, control pulses pS34 for the signal selection control lines are changed to have a Low level to turn off the selection switches Sw7 and Sw10. Thus, the N+S signals Vns2 are held in the storage capacitors C7 and C10. The period from the time t15 to the time t17 described above will be called a storage operation period Ts2 of the N+S signal Vns2.

At the same time, the N+S signals Vns2 are input to the corresponding comparators Comp3 and Comp4 through the coupling capacitors C8 and C11, but the coupling capacitors C8 and C11 hold a potential difference corresponding to the difference between the initialization voltage Vrf and the N signal Vn2. Thus, the S signal Vs2 being the difference between the N+S signal Vns2 and the N signal Vn2 is input as an S signal corresponding to the electric charge of the photoelectric conversion element D1. Thus, a correlated double sampling is implemented which uses the coupling capacitors C8 and C11 for a clamp operation.

In the pixel signal reading operation performed on the second row, at a time t18, the control pulse pR2 for the reset control line is changed to have a High level. Thus, the electric potential of the FD node 301 and the odd-numbered column signal line 231 are reset. At a time t19 when the electric potential of the FD node 301 is sufficiently reset, the control pulse pR2 for the reset control line and the control pulse pSEL2 for the vertical selection line are changed to have a Low level. Thus, pixels of the second row including the pixel P21 is electrically isolated from the odd-numbered column signal line 231.

In a column signal processing operation performed on the second row, at and after the time t17, AD conversion is executed on the S signals Vs2 input to the comparators Comp3 and Comp4. First of all, under control of the TG 211, the ramp waves Vrmp3 and Vrmp4 which have an identical waveform and will be called ramp waves Vrmp34 are output from the odd-numbered column ramp wave generating unit 205 to the odd-numbered column ramp wave signal line. They are then compared with the inputs of the comparators Comp3 and Comp4 corresponding to the S signals Vs2 which have been already input thereto.

Simultaneously with the output of the ramp waves Vrmp34, under control of the TG 211 through the control pulse pCNT for the counter control line, the counter circuits 531 and 541 are set to up-count. In response thereto, a counting operation starts from the count value when the AD conversion performed on the N signals Vn2 has stopped. At a time t20, the output of the ramp waves Vrmp34 ends.

At some point between the times t17 and t20, the signal level of the ramp waves Vrmp34 and the signal level of the S signals Vs2 which are input to the corresponding comparators Comp3 and Comp4 are matched. However, due to variations of the comparators Comp3 and Comp4, they may be matched at different times. When the signal level of the ramp waves Vrmp34 and the signal level of the S signals Vs2 which are input to the corresponding comparators Comp3 and Comp4 are matched, comparison result signals are output from the comparators Comp3 and Comp4 to the corresponding counter circuits 531 and 541. The counter circuits 531 and 541 having received the comparison result signals output the current count values and the latch signals to the corresponding latch circuits 532 and 542.

Here, the counter circuits 531 and 541 start from the count values of the N signals Vn2 (corresponding to the voltage level as a result of the addition of a noise component n to the initialization voltage Vrf) of the comparators Comp3 and Comp4 having been set to down-count in advance. Because the S signals Vs2 containing the noise component n have been up-counted, the S signals Vs2 in which the noise component n has been cancelled are only counted. The latch circuits 532 and 542 having received the latch signals temporarily hold the current count values.

In response to the completion of the output of the ramp waves Vrmp34 at the time t20, the count values held by the latch circuits 532 and 542 are transferred to the computing circuit 513 as digital S signals Ds2 of the pixel P21. This operation is controlled by the TG 211 through the control pulse pLTC for the latch control line and the control pulse pCAL for the computing control line.

The period from the time t17 to the time t20 is the AD conversion period TAs2 of the S signals Vs2. This period is also a storage period in which the N+S signals Vns2 are required to be held in the storage capacitors C7 and C10.

In the computing circuit 513, the averaging illustrated in FIGS. 9A to 9C is performed, and the digital S signal having reduced noise of the pixel is stored. Here, the binary numbers ADo1 and ADo2 in FIG. 9A may be replaced by the digital S signals of the pixels transferred from the latch circuits 532 and 542 so that the computing illustrated in FIGS. 9A to 9C can be performed.

The column signal processing operation performed on the second row has been described in which signals of pixels of the second row including the pixel P21 are read to the corresponding odd-numbered column signal processing units 203 and undergo a computing process in the analog-digital conversion processing and computing circuit 513, and the computing result is stored as a digital signal.

Next, the period from the time t21 to the time t23 is a horizontal output operation period for the second row in which the digital S signals of pixels of the second row stored in the computing circuit 513 after the computing are output. In the period from the time t21 to the time t23, the TG 211 controls the odd-numbered column horizontal scanning unit 207 through the control line 285 so as to generate a control pulse pH3 for selecting the odd-numbered column signal processing units 203 in a predetermined order through horizontal selection lines being the odd-numbered column selection line 251 correspondingly connected thereto.

Then, the digital S signals Dsig3 of the pixels of the second row stored in the computing circuit 513 after the computing for the selected odd-numbered column signal processing unit 203 are output to a digital output line being the odd-numbered column output line 261. At that time, in the noise reduction operation, the control pulse pH4 for the horizontal selection line is stopped in order to output the digital S signals only of the pixels of the second row after the computing.

In the noise reduction operation, the pixels of the first row including the pixel P11 and the pixels of the second row including the pixel P21 use the common odd-numbered column signal line 231 in time-division manner so that the pixel signal reading operation can be performed. The odd-numbered column signal processing unit 203 is capable of performing four-channel analog-digital conversion processing. Thus, pixel signals of the first row can undergo the analog-digital conversion in two channels simultaneously, and pixel signals of the second row read out with a time difference from the reading operation of the pixels of the first row undergo analog-digital conversion in other two channels simultaneously.

A time difference is also provided in the computing in the computing circuit 513 performed on the pixel signals of the first row and the pixel signals of the second row having undergone the analog-digital conversion processing in two channels. Because the odd-numbered column output line

261 also includes two-channel digital output lines, the digital S signals DSig1 of the pixels of the first row and the digital S signals Dsig3 of the pixels of the second row, which are stored in the computing circuit 513, are also output with a time difference therebetween.

As described above, digital S signals DSig1, DSig3 of pixels of two rows with a time difference are output from the odd-numbered column signal processing units 203 selected in a predetermined order, are output in parallel from the odd-numbered column output unit 209 through the digital output lines. Then, the output of the signals of the pixels of the two rows completes.

This can reduce the horizontal synchronization period, compared with a case where the readout and AD conversion of the N signals Vn1 and S signals Vs1 of pixels of the first row and the readout and AD conversion of the N signals Vn2 and S signals Vs2 of pixels of the second row are sequentially performed. Therefore, the frame rate in the noise reduction operation can be improved.

After the output of pixel signals of the first row completes, the read operation is started to be performed on the third row in response to the horizontal synchronization signal at a time t22. Because this is the same operation as the one performed on the first row, it is not illustrated in FIG. 15. The operation having described up to this point is performed on every two rows with a delay from the starting row in synchronization with the horizontal synchronization signal, and pixel signals of the rows are sequentially output. Therefore, the exposure periods of the rows are shifted in time row by row. Then, by repeating the operation in one horizontal synchronization period in the period from the time t01 to the time t22 for every two rows, signals of every two rows of pixels of the pixel array 201 can be read out.

Figure 16:
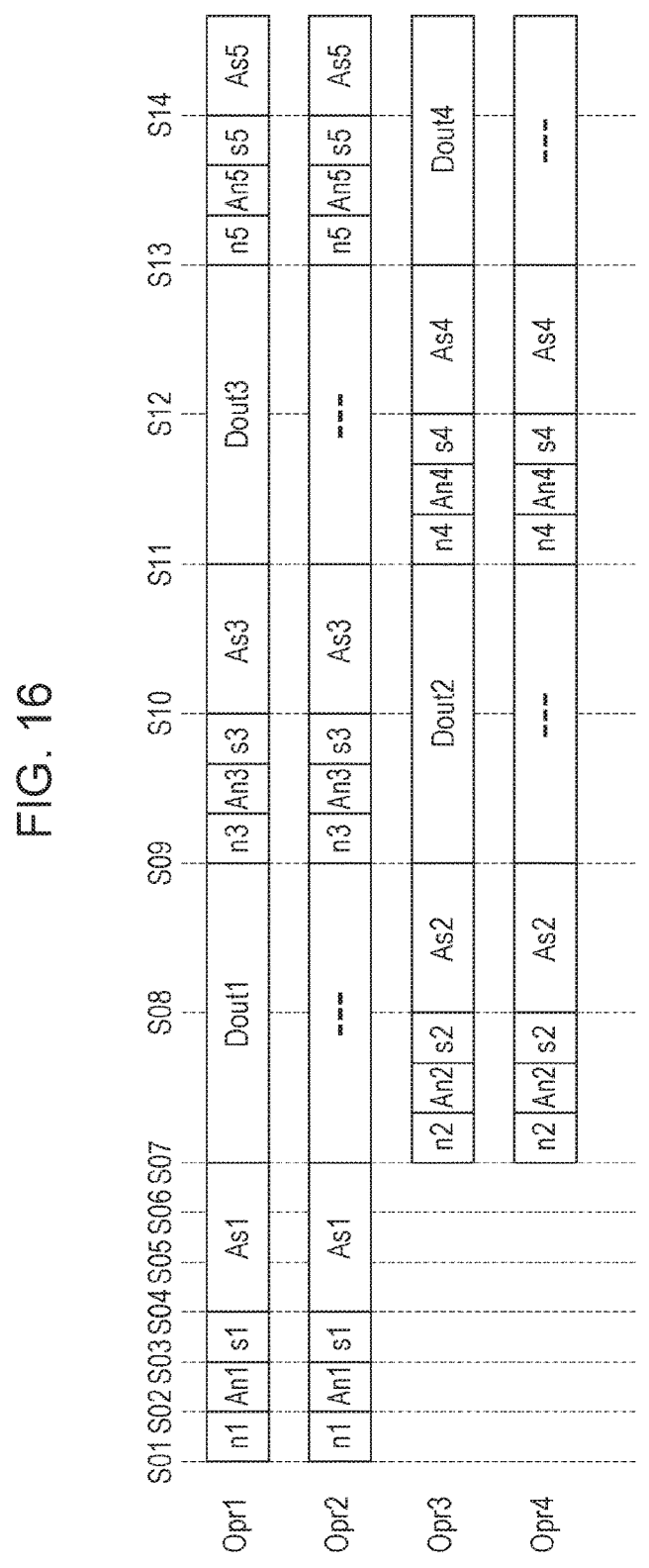

FIG. 16 illustrates serial operations of a noise reduction operation to be performed by the image pickup device 12 according to this exemplary embodiment. FIG. 16 illustrates the noise reduction operation by using the same references and the same time points as those in FIGS. 12 and 13.

For the noise reduction operation, two-channel analog-digital conversion processing is performed on signals of pixels of the first row simultaneously, as described with reference to FIG. 15. In other words, both of the operations Opr1 and Opr2 read signals of the pixels of the first row to the odd-numbered column signal line 231 in the period from the time s01 to the time s04. In the period from the time s04 to the time s07, signals of pixels of the first row undergo analog-digital conversion in the odd-numbered column signal processing unit 203.

At a time s07, the averaging is performed in the computing circuit 513 on the signals of pixels of the first row having undergone the simultaneous two-channel analog-digital conversion processing, and the averaging result is stored. The period from the time s07 to the time s09 is a horizontal output operation period Dout1 in which the operation Opr1 outputs the digital signals of the pixels of the first row after computing, as illustrated in FIG. 15.

From the time s07, the two-channel analog-digital conversion processing is performed on signals of pixels of the second row simultaneously. In other words, both of the operations Opr3 and Opr4 read signals of the pixels of the second row to the odd-numbered column signal line 231 in the period from the time s07 to the time s08. In the period from the time s08 to the time s09, signals of pixels of the second row undergo analog-digital conversion in the odd-numbered column signal processing unit 203.

At a time s09, the averaging is performed in the computing circuit 513 on the signals of pixels of the second row having undergone the simultaneous two-channel analog-digital conversion processing, and the averaging result is stored. The period from the time s09 to the time s11 is a horizontal output operation period Dout2 in which the operation Opr3 outputs the digital signals of the pixels of the second row after computing, as illustrated in FIG. 15.

This can be implemented by execution of an operation for reading signals from the pixels of the first row and pixels of the second row by using the common odd-numbered column signal line 231 in time-division manner, as illustrated in FIG. 15. When the horizontal synchronization signals HD are output at the times s01, s09, and s13, signals are read out from pixels of odd-numbered rows in synchronization with the horizontal synchronization signals HD in the operations Opr1 and Opr2. Thus, the analog-digital conversion processing can be performed in two channels simultaneously.

In the operations Opr3 and Opr4, signals are read out from pixels of even-numbered rows from the times s07 and s11 which are time points based on the time difference in the pixel reading operation period for the odd-numbered rows and the period for the column signal processing operation. Thus, the analog-digital conversion processing can be performed in two channels simultaneously. It is understood from this that the noise reduction operation which reads out signals from pixels of every row in the pixel array 201 can be continuously performed.

In this case, the pixel reading operation on the second row is started from the time s07, instead of the time s04 following the end of the pixel reading operation performed on the first row. This is for making the time differences equal in the reading operations on the odd-numbered rows and the even-numbered row for the purpose of providing uniform differences between exposure periods of rows.

Having described that according to this exemplary embodiment, variations of the comparators as noise occurring in the column circuit, variations of the comparators may cause noise in ramp waves. Ramp waves output as ramp waves having an identical shape from the odd-numbered column ramp wave generating unit are influenced by fluctuations in phase and amplitude and noise before they are input to the comparators.

In combination with the fluctuations and noise of the ramp waves and variations of the comparators, the comparison results are matched at different times. This may be noise occurring in the column circuit in the analog-digital conversion processing, but the noise can be reduced by executing the predetermined computing process according to this exemplary embodiment.

Up to this point, the readout of signals from odd-numbered column pixels and the operations of the odd-numbered column signal processing unit 203, odd-numbered column ramp wave generating unit 205 and odd-numbered column horizontal scanning unit 207 have been described according to this exemplary embodiment. However, it is apparent that the readout of signals from even-numbered column pixels and the operations of the even-numbered column signal processing unit 204, even-numbered column ramp wave generating unit 206 and even-numbered column horizontal scanning unit 208 can be described by using operating timing illustrated in FIGS. 15 and 16.

Thus, signals of odd-numbered column pixels and signals of even-numbered column pixels can be output in parallel from the odd-numbered column output unit 209 and the even-numbered column output unit 210. Therefore, the frame rates in the overlap-reading operation and noise reduction operation can be improved.

As described above, according to this exemplary embodiment, in noise reduction operation, four-channel analog-digital conversion units provided for each column signal line are used to perform an operation for reading signals of pixels of two rows at least partially in parallel. Thus, the frame rate can be improved. In addition, noise reduction can be achieved by using the two-channel analog-digital conversion units to perform analog-digital conversion and averaging on signals of one pixel simultaneously.

Thus, the noise reduction operation of this exemplary embodiment can have a doubling of the frame rate of the noise reduction operation according to the second exemplary embodiment.

Furthermore, signals of odd-numbered column pixels and signals of even-numbered column pixels can be output in parallel from different output units so that the frame rates can further be improved in both of the overlap-reading operation and the noise reduction operation.

Next, a variation example of this embodiment will be described with reference to FIG. 17. FIG. 17 illustrates a variation example of the noise reduction operation by using the same references and the same time points as those in FIG. 16. In a variation example of the noise reduction operation, two-channel analog-digital conversion processing is performed on signals of pixels of the first row simultaneously, as described with reference to FIG. 16.

In other words, both of the operations Opr1 and Opr2 read signals of the pixels of the first row to the odd-numbered column signal line 231 in the period from the time s01 to the time s04. In the period from the time s04 to the time s07, signals of pixels of the first row undergo analog-digital conversion in the odd-numbered column signal processing unit 203.

At a time s07, the averaging is performed in the computing circuit 513 on the signals of pixels of the first row having undergone the simultaneous two-channel analog-digital conversion processing, and the averaging result is stored. At that time, because the comparators Comp1 and Comp2, the counter circuits 511 and 521, and the latch circuits 512 and 522 are released from the column signal processing operation of the first row, an operation for reading signals from pixels of the third row and the column signal processing operation thereon can be started.

Thus, in the period from the time s07 to the time s09, the horizontal output operation Dout1 of the first row and the pixel signal reading operation of the third row and the column signal processing operation are performed simultaneously. At the time s09, before the digital S signals of pixels of the third row are transferred from the latch circuits 512 and 522 to the computing circuit 513, the timing of the TG 211 is controlled so as to stop the horizontal output operation Dout1 of the first row. From the time s09, the horizontal output operation Dout3 of the third row and the pixel signal reading operation of the fifth row and the column signal processing operation can also be performed simultaneously.

In the noise reduction operation, from the time s04, the two-channel analog-digital conversion processing is simultaneously performed on the signals of pixels of the second row. In other words, both of the operations Opr3 and Opr4 read signals of the pixels of the second row to the odd-numbered column signal line 231 in the period from the time s04 to the time s07. In the period from the time s07 to the time s08, signals of pixels of the second row undergo analog-digital conversion in the odd-numbered column signal processing unit 203.

At a time s08, the averaging is performed in the computing circuit 513 on the signals of pixels of the second row having undergone the simultaneous two-channel analog-digital conversion processing, and the averaging result is stored. At that time, because the comparators Comp3 and Comp4, the counter circuits 531 and 541, and the latch circuits 532 and 542 are released from the column signal processing operation of the second row, an operation for reading signals from pixels of the fourth row and the column signal processing operation thereon can be started.

Thus, in the period from the time s08 to the time s10, the horizontal output operation Dout2 of the second row and the pixel signal reading operation of the fourth row and the column signal processing operation are performed simultaneously. At the time s10, before the digital S signals of pixels of the fourth row are transferred from the latch circuits 532 and 542 to the computing circuit 513, the timing of the TG 211 is controlled so as to stop the horizontal output operation Dout2 of the second row.

From the time s10, the horizontal output operation Dout4 of the fourth row and the pixel signal reading operation of the sixth row and the column signal processing operation can also be performed simultaneously. This can be implemented by execution of an operation for reading signals from the pixels of the first row and pixels of the second row by using the common odd-numbered column signal line 231 in time-division manner, as illustrated in FIG. 15.

When the horizontal synchronization signals HD are output at the times s01, s07, s09, s11, and s13, signals are read out from pixels of odd-numbered rows in synchronization with the horizontal synchronization signals HD in the operations Opr1 and Opr2. Thus, the analog-digital conversion processing can be performed in two channels simultaneously. In the operations Opr3 and Opr4, signals are read out from pixels of even-numbered rows from the times s04, s08, s10, s12, s14 which are time points based on the time difference in the pixel reading operation period for the odd-numbered rows. Thus, the analog-digital conversion processing can be performed in two channels simultaneously.

It is understood from this that the variation example of the noise reduction operation which reads out signals from pixels of every two rows in the pixel array 201 can be continuously performed. Furthermore, the pixel reading operation and the column signal processing operation are performed simultaneously with the horizontal output operation performed on the previous row so that a doubling of frame rate of the noise reduction operation can be achieved. As described above, according to the variation example of the noise reduction operation, the analog-digital conversion processing is performed in two channels simultaneous, and the frame rate substantially equal to that of the overlap-reading operation as illustrated in FIG. 12 can be achieved.

As described above, according to the variation example of this exemplary embodiment, in the variation example of the noise reduction operation, the column signal processing unit provided for each column signal line is used to perform the pixel reading operation and the horizontal output operation on the previous row in parallel for improvement of the frame rate. In addition, noise reduction can be achieved by using the two-channel analog-digital conversion units to perform analog-digital conversion and averaging on signals of one pixel simultaneously. The frame rate substantially equal to that of the overlap-reading operation as illustrated in FIG. 12 can be achieved as well as the noise reduction.

Fourth Exemplary Embodiment

Next, with reference to FIG. 18 in addition to FIGS. 1 to 3 and FIGS. 5 to 9C, a fourth exemplary embodiment will be described. Because the fundamental configuration and operations of an imaging apparatus and the fundamental configuration and operations of an image pickup device according to this exemplary embodiment are the same as those of the first exemplary embodiment, this exemplary embodiment will be described by using the same drawings and references. In other words, the circuit illustrated in FIG. 18 is applied to the schematic configuration of the image pickup device 12 illustrated in FIG. 2 to execute the overlap-reading operation illustrated in FIGS. 5 and 6 and the noise reduction operation illustrated in FIGS. 7 and 8.

According to the first exemplary embodiment, two-channel analog-digital conversion units provided for each column signal line are used to perform analog-digital conversion on a signal of one pixel simultaneously, and the resulting signals are averaged in the computing circuits provided in the column signal processing units, for noise reduction.

According to this exemplary embodiment on the other hand, an overlap-reading operation and a noise reduction operation are performed in a case where one computing circuit is provided between column signal processing units and an output unit.

Figure 18:
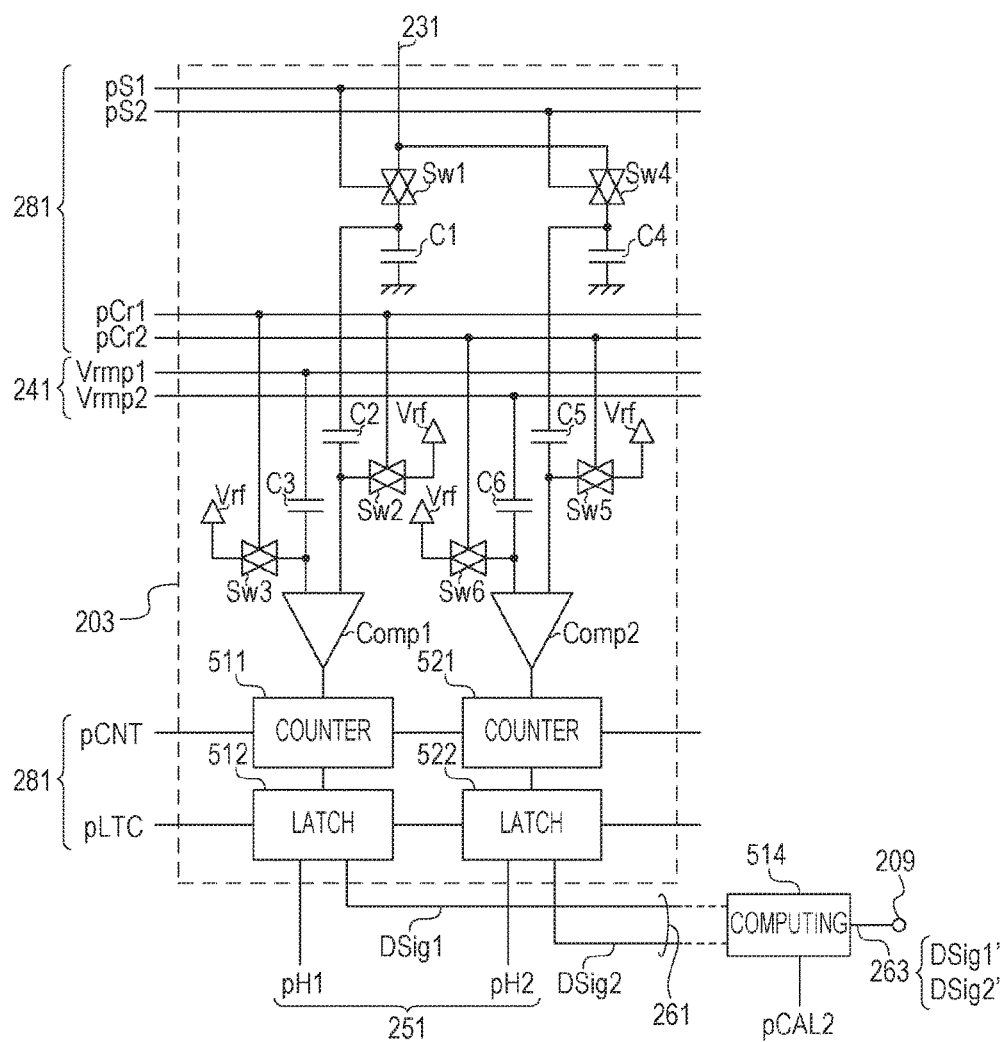
FIG. 18 illustrates a circuit configuration of a column signal processing unit according to a fourth exemplary embodiment.

FIG. 18 illustrates a circuit configuration of the odd-numbered column signal processing unit 203 in the image pickup device 12 according to this exemplary embodiment. According to this exemplary embodiment, the odd-numbered column signal processing unit 203 corresponding to odd-numbered column pixels will be described, for example. Because the even-numbered column signal processing unit 204 corresponding to even-numbered column pixels is the same as odd-numbered column signal processing unit 203, the repetitive description will be omitted.

The signal processing unit in FIG. 18 includes storage capacitors, coupling capacitors, switches, comparators, counter circuits, and latch circuits. The signal processing unit is different from the one illustrated in FIG. 4 only in that the computing circuit is removed. Therefore, detail description of the signal processing unit will be omitted.

According to this exemplary embodiment, the latch circuits 512 and 522 output their holding count values to the corresponding digital output lines under control of control pulses pH1 and pH2 for the corresponding horizontal selection lines. The digital output lines are commonly connected to the latch circuits 512 and 522 in another odd-numbered column signal processing unit 203 corresponding to odd-numbered column pixels.

A computing circuit 514 performs the predetermined computing illustrated in FIGS. 9A to 9C on count values output from the latch circuits 512 and 522 to the corresponding digital output lines under control of control pulse pCAL for the computing control line connected to the TG 211. The computing circuit 514 further outputs count values having undergone the predetermined computing as digital signals DSig1' and DSig2' from pixels to the odd-numbered column output unit 209 through a digital output line 263 under control through the control pulse pCAL for the computing control line. A digital output line for even-numbered columns is also commonly connected in a computing circuit in the even-numbered column signal processing units 204 corresponding to even-numbered column pixels.

Next, an overlap-reading operation to be performed by the image pickup device 12 according to this exemplary embodiment will be described. The overlap-reading operation reads out N signals which have reset the FD node 301 and S signals which have read out the electric charges of the photoelectric conversion element D1 in the FD node 301 from the first and second pixels. Then, the common odd-numbered column signal line 231 is used to perform analog-digital conversion processing on the signal of the first pixel and the signal of the second pixel read with a time difference therebetween, and the digitized pixel signals are output.

At that time, reading out signals from pixels in the pixel array 201 by repeating the overlap-reading operation where the first pixel is handled as a pixel of an odd-numbered row and the second pixel is handled as a pixel of an even-numbered row can implement one photographing operation.

According to the first exemplary embodiment, the period from the time t18 to the time t22 in FIG. 5 is the horizontal output operation period of the first row in which digital S signals of the pixels of the first row stored in the computing circuit 513 are output. According to this exemplary embodiment on the other hand, the period is a horizontal output operation period of the first row in which count values of pixels of the first row held in the latch circuit 512 are output. In the period from the time t18 to the time t22, the TG 211 controls the odd-numbered column horizontal scanning unit 207 through the control line 285 so as to generate a control pulse pH1 for selecting the odd-numbered column signal processing units 203 in a predetermined order through horizontal selection lines being the odd-numbered column selection line 251 correspondingly connected thereto.

Then, the count value DSig1 of the pixels of the first row held in the latch circuit 512 for the selected odd-numbered column signal processing unit 203 are output to a digital output line being the odd-numbered column output line 261. In the overlap-reading operation, the computing circuit 514 outputs the input count values of the pixels without performing the computing directly as the digital signals DSig1' of the pixels to the odd-numbered column output unit 209 through the digital output line.

Also, according to the first exemplary embodiment, the period from the time t21 to the time t23 in FIG. 5 is a horizontal output operation period for the second row in which the digital S signals of pixels of the second row stored in the computing circuit 513 after the computing are output. According to this exemplary embodiment on the other hand, the period is a horizontal output operation period for the second row in which count values of pixels of the second row held in the latch circuit 522 are output.

In the period from the time t21 to the time t23 in FIG. 5, the TG 211 controls the odd-numbered column horizontal scanning unit 207 through the control line 285. A control pulse pH2 is generated for selecting the odd-numbered column signal processing units 203 in a predetermined order through horizontal selection lines being the odd-numbered column selection line 251 correspondingly connected thereto. Then, the count value DSig2 of the pixels of the second row held in the latch circuit 522 for the selected odd-numbered column signal processing unit 203 are output to a digital output line being the odd-numbered column output line 261.

In the overlap-reading operation, the computing circuit 514 outputs the input count values of the pixels without performing the computing directly as the digital signals DSig2' of the pixels to the odd-numbered column output unit 209 through the digital output line.

In the overlap-reading operation, the pixels of the first row including the pixel P11 and the pixels of the second row including the pixel P21 use the common odd-numbered column signal line 231 in time-division manner so that the pixel operation can be performed. Because the odd-numbered column signal processing unit 203 is capable of performing two-channel AD conversion processing, the two-channel AD conversions are executed with a time difference between pixel reading operations performed on the pixel signals of the first row and the pixel signals of the second row.

Because the odd-numbered column output line 261 also includes two-channel digital output lines, the count values of the pixels of the first row and pixels of the second row, which are held in the latch circuits 512 and 522, are also output with a time difference therebetween. As described above, count values DSig1 and DSig2 of pixels of two rows with a time difference are output from the odd-numbered column signal processing units 203 selected in a predetermined order and are input to the computing circuit 514 through the digital output line.

The computing circuit 514 outputs the input count values of pixels without performing the computing directly as the digital signals of the pixels under control of the TG 211 through the control pulse pCAL for the computing control line. Then, the count values DSig1 and DSig2 in the digital output line are output in parallel as the digital signals DSig1' and DSig2' from the odd-numbered column output unit 209 through the corresponding digital output lines. Thus, the output of the signals of the pixel of the two rows completes.

After the output of the pixel signals of the first row completes, the read operation of the third row is started in response to the horizontal synchronization signal at a time t22 in FIG. 5. The operations described above are performed on every two rows starting from the start row with delays in synchronization with the horizontal synchronization signals, and signals of pixels of the rows are sequentially output.

Next, a noise reduction operation to be performed by the image pickup device 12 according to this exemplary embodiment will be described.

In a noise reduction operation, from pixels of the first row, an N signal resetting the FD node 301 and an S signal reading out an electric charge of the photoelectric conversion element D1 to the FD node 301 are read out. The odd-numbered column signal line 231 is used to perform analog-digital conversion processing on the signal of the pixels of the first row and output the digitized pixel signals.

At that time, because the odd-numbered column signal processing unit 203 is capable of performing two-channel analog-digital conversion processing, the two-channel analog-digital conversion processing is performed on the signals of pixels of the first row. The computing process of the noise reduction operation illustrated in FIGS. 9A to 9C is performed on the results of the two-channel analog-digital conversion in the computing circuit 514, and the results are output therefrom. Reading out signals from pixels in the pixel array 201 by repeating the noise reduction operation can implement one photographing operation.

Here, according to the first exemplary embodiment, the period from the time t18 to the time t22 in FIG. 7 is a horizontal output operation period for the first row in which digital S signals of pixels of the first row after the computing, which are stored in the computing circuit 513, are output. According to this exemplary embodiment on the other hand, the period is a horizontal output operation period for the first row in which count values of the two-channels for the pixels of the first row, which are held in the latch circuits 512 and 522, are output.

In the period from the time t18 to the time t22 in FIG. 7, the TG 211 controls the odd-numbered column horizontal scanning unit 207 through the control line 285 so as to generate control pulses pH1 and pH2 for selecting the odd-numbered column signal processing units 203 in a predetermined order through the odd-numbered column selection lines 251 correspondingly connected thereto.

Then, the count values DSig1 and DSig2 of the two channels for the pixels of the first row, which are held in the latch circuits 512 and 522 in the selected odd-numbered column signal processing unit 203, are output to the corresponding odd-numbered column output lines 261.

In the noise reduction operation, the computing circuit 514 performs the computing process of the noise reduction operation illustrated in FIGS. 9A to 9C on the input two-channel count values DSig1 and DSig2 of the pixel. The result is output as a digital signal DSig1' of the pixel to the odd-numbered column output unit 209 through the digital output line 263. Here in the noise reduction operation, the digital S signals of the pixels of the first row after the computing are only output.

After the output of the pixel signals of the first row completes, the read operation of the second row is started in response to the horizontal synchronization signal at a time t22 in FIG. 7. The operations described above are performed on every row starting from the start row in synchronization with the horizontal synchronization signals where a delay is given for each row, and signals of pixels of the rows are sequentially output.

Having described that according to this exemplary embodiment, variations of the comparators as noise occurring in the column circuit, variations of the comparators may cause noise in ramp waves. Ramp waves output as ramp waves having an identical shape from the odd-numbered column ramp wave generating unit are influenced by fluctuations in phase and amplitude and noise before they are input to the comparators.

In combination with the fluctuations and noise of the ramp waves and variations of the comparators, the comparison results are matched at different times. This may be noise occurring in the column circuit in the analog-digital conversion processing, but the noise can be reduced by executing the predetermined computing process according to this exemplary embodiment.

Up to this point, the readout of signals from odd-numbered column pixels and the operations of the odd-numbered column signal processing unit 203 and odd-numbered column horizontal scanning unit 207 have been described according to this exemplary embodiment. However, it is apparent that the readout of signals from even-numbered column pixels and the operations of the even-numbered column signal processing unit 204 and even-numbered column horizontal scanning unit 208 can be described by using operating timing illustrated in FIGS. 5 to 8.

Thus, signals of odd-numbered column pixels and signals of even-numbered column pixels can be output in parallel from the odd-numbered column output unit 209 and the even-numbered column output unit 210. Therefore, the frame rates in the overlap-reading operation and noise reduction operation can be improved.

The column signal processing unit and the computing circuit in FIG. 18 are also applicable to the variation example of the first exemplary embodiment described with reference to FIG. 10. In other words, in the horizontal output operation Dout1 performed on the first row in the period from the time s07 to the time s09, the computing circuit 514 performs the computing process of the noise reduction operation described with reference to FIGS. 9A to 9C on the input two-channel count values of a given pixel. The result is output as a digital signal DSig1' of the pixel to the odd-numbered column output unit 209 through the output line 263. The same process may be performed in the horizontal output operation Dout2 for the second row in the period from the time s09 to the time s1 and in the horizontal output operation Dout3 for the third row in the period from the time s11 to the time s13.

This exemplary embodiment is also applicable to the second exemplary embodiment. In other words, the computing circuit of the column signal processing unit in FIG. 11 is changed to the position illustrated in FIG. 18, and the computing circuit 514 performs the computing process of the noise reduction operation described with reference to FIGS. 14A to 14C on the input four-channel count values of a given pixel. The result is output as a digital signal DSig1' of the pixel to the odd-numbered column output unit 209 through the output line 263.

Also, this exemplary embodiment is applicable to the third exemplary embodiment. In other words, the computing circuit of the column signal processing unit in FIG. 11 is changed to the position illustrated in FIG. 18, and the computing circuit 514 performs the computing process of the noise reduction operation described with reference to FIGS. 9A to 9C on the two-channel count values of two pixels, which are input with a time difference therebetween. The result is output as a digital signals DSig1' and DSig3' of the pixel to the odd-numbered column output unit 209 through the output line 263.

As described above, according to this exemplary embodiment, in an overlap-reading operation, two-channel analog-digital conversion units provided for each column signal line are used to perform an operation for reading signals of pixels of an odd-numbered row an operation for reading signals of pixels of an even-numbered row in parallel for improvement of the frame rate.

In a noise reduction operation, two-channel analog-digital conversion units provided for each column signal line are used to perform analog-digital conversion simultaneously and then averaging on a signal of one pixel for noise reduction. The imaging by performing the overlap-reading operation and the imaging by performing the noise reduction operation may be switched as required so that an increase of the time of the photographing operation can be avoided.

The type of imaging may be switched in accordance with a selection directly input by a user through the operating unit 16. The type of imaging may be selected by the synchronization control unit 15 in accordance with the signal processing such as white balance adjustment, color correction, gamma correction, AF (Auto Focus), and AE (Auto Exposure) performed by the signal processing unit 13. Furthermore, providing the computing circuit between the column signal processing units and the output unit can reduce the number of computing circuits.

Furthermore, signals of odd-numbered column pixels and signals of even-numbered column pixels can be output in parallel from different output units so that the frame rates can further be improved in both of the overlap-reading operation and the noise reduction operation.

Fifth Exemplary Embodiment

Figure 19A:
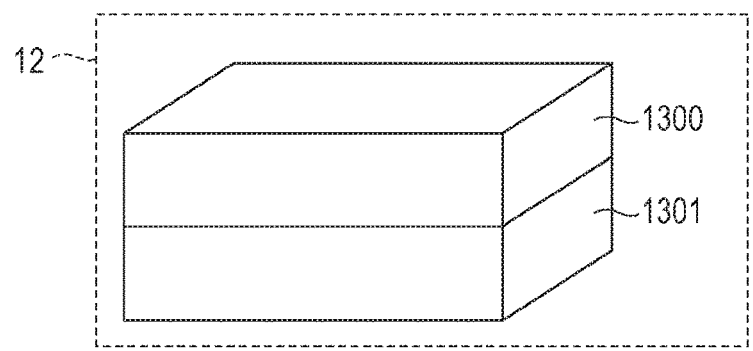
FIGS. 19A and 19B illustrate a configuration example of an image pickup device according to a fifth exemplary embodiment.
Figure 19B:
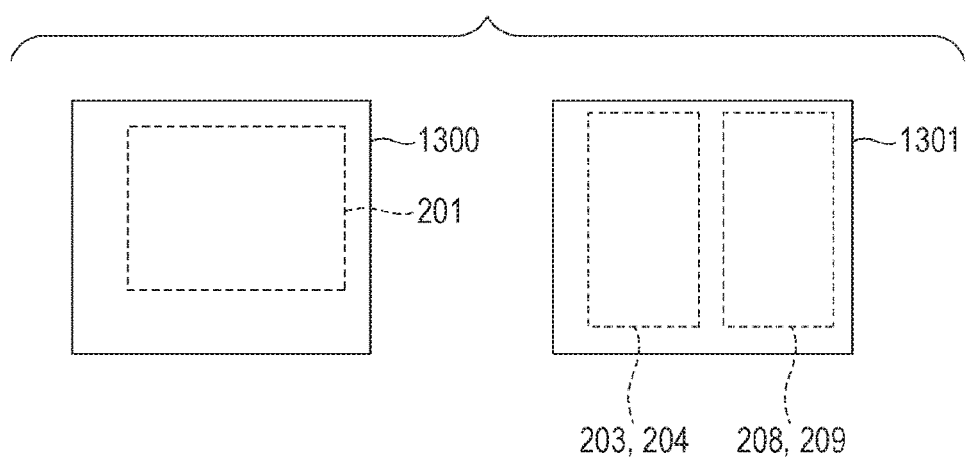

With reference to FIGS. 19A and 19B, a fifth exemplary embodiment will be described. FIGS. 19A and 19B illustrate a configuration example in a case where the image pickup device 12 according to any one of the first to fourth exemplary embodiments is configured by two or more semiconductor chips which are vertically laminated with each other. FIG. 19A is an oblique view, and FIG. 19B is top views of the chips.

In a case where the image pickup device 12 is configured by two or more semiconductor chips, an image sensor chip 1300 and a high-speed logic process chip 1301 are laminated in chips with each other, as illustrated in FIGS. 19A and 19B.

The image sensor chip 1300 which is disposed on the upper side of the two semiconductor chips has the pixel array 201 including the photoelectric conversion unit. The high-speed logic process chip 1301 which is disposed on the bottom side has a part capable of performing high-speed processing on digital data, for example, such as the column signal processing units 203 and 204 including the column AD conversion unit and the horizontal scanning units 208 and 209.

The chip 1301 may further have a compression/encoding unit configured to compress and encode a signal, a memory configured to store a signal, and a signal processing unit configured to perform a predetermined signal process. As illustrated in FIGS. 19A and 19B, in a case where the image pickup device 12 is configured by a stacked image sensor, the bottom chip and the upper chip may not necessarily have to have an identical size though it may sometimes be required.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-065245, filed Mar. 26, 2015, which is hereby incorporated by reference herein in its entirety.

What is claimed is:

1. An imaging apparatus comprising:
an image pickup device having a pixel array in which a plurality of pixels is arranged in a matrix form, a plurality of column signal lines provided for each column of the pixel array and receiving input of signals of the plurality of pixels of the column, a plurality of AD conversion units provided in parallel on one side of each of the plurality of column signal lines, and an averaging unit that averages output signals of the plurality of AD conversion units; and
a drive unit that selectively drives the image pickup device in one driving mode of a first driving mode in which output signals of a plurality of different pixels, which are arranged in different rows and a same column in the pixel array, are AD converted by each of the plurality of AD conversion units and a second driving mode in which an output signal of a same pixel in the pixel array is AD converted by the plurality of AD conversion units in parallel,
wherein the averaging unit averages the AD converted output signals of the same pixel in the second driving mode.

2. The imaging apparatus according to claim 1, wherein the image pickup device further has an output unit that outputs averaging results from the averaging unit in a predetermined order.

3. The imaging apparatus according to claim 1, wherein, in the first driving mode, a period in which a signal of one of the plurality of pixels is processed and a period in which a signal of another of the plurality of pixels is processed overlap at least partially.

4. The imaging apparatus according to claim 3, wherein, in the first driving mode, a period in which a signal of one of the plurality of pixels is AD converted by one of the plurality of AD conversion units and a period in which a signal of another of the plurality of pixels is AD converted by another of the plurality of AD conversion units overlap at least partially.

5. The imaging apparatus according to claim 3, wherein in the first driving mode, a signal of one of the plurality of pixels is read out to one of the column signal lines in a period in which a signal of another of the plurality of pixels is AD converted by one of the plurality of AD conversion units.

6. The imaging apparatus according to claim 3, wherein in the first driving mode, a signal of one of the plurality of pixels is read out to one of the column signal lines in a period in which a signal of another of the plurality of pixels is output from one of the plurality of AD conversion units.

7. The imaging apparatus according to claim 3, wherein in the first driving mode, a signal of one of the plurality of pixels is AD converted by one of the plurality of AD conversion units in a period in which a signal of another of the plurality of pixels is output from another of the plurality of AD conversion units.

* * * * *